(12) United States Patent
Magi et al.

(10) Patent No.: US 12,449,896 B2
(45) Date of Patent: Oct. 21, 2025

(54) USER-TO-AVATAR ACTION MAPPING AND ADJUSTMENT

(71) Applicant: Intel Corporation, Santa Clara, CA (US)

(72) Inventors: Aleksander Magi, Portland, OR (US); Glen J. Anderson, Beaverton, OR (US); Sangeeta Ghangam Manepalli, Chandler, AZ (US); David Warren Browning, Portland, OR (US); Michael Daniel Rosenzweig, Queen Creek, AZ (US); Stanley Jacob Baran, Chandler, AZ (US); Chia-Hung Sophia Kuo, Folsom, CA (US); Passant Vatsalya Karunaratne, Chandler, AZ (US); Atsuo Kuwahara, Camas, WA (US); Siew Wen Chin, Penang (MY); Haichuan Tan, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 274 days.

(21) Appl. No.: 18/129,495

(22) Filed: Mar. 31, 2023

(65) Prior Publication Data

US 2024/0329731 A1    Oct. 3, 2024

(51) Int. Cl.
*G06F 3/01* (2006.01)
*G06T 13/40* (2011.01)

(52) U.S. Cl.
CPC .............. *G06F 3/013* (2013.01); *G06T 13/40* (2013.01); *G06F 2203/011* (2013.01)

(58) Field of Classification Search
CPC ........................................ G06F 3/013
See application file for complete search history.

(56) References Cited

U.S. PATENT DOCUMENTS

| 10,440,324 B1 | 10/2019 | Lichtenberg et al. |
| 10,819,950 B1 | 10/2020 | Lichtenberg et al. |
| 11,252,374 B1 | 2/2022 | Lichtenberg et al. |
| 2008/0136895 A1 | 6/2008 | Mareachen |

(Continued)

FOREIGN PATENT DOCUMENTS

KR    20210154961 A    12/2021

OTHER PUBLICATIONS

International Searching Authority, "International Search Report," issued in connection with International Patent Application No. PCT/US2023/082972, issued on Apr. 9, 2024, 3 pages.

(Continued)

*Primary Examiner* — Shivang I Patel
(74) *Attorney, Agent, or Firm* — Hanley, Flight & Zimmerman, LLC

(57) ABSTRACT

Methods, apparatus, systems, and articles of manufacture for user-to-avatar mapping and adjustment are disclosed. An example apparatus includes processor circuitry to at least one of instantiate or execute the machine readable instructions to: determine a dissonance between a first orientation of a user in a real-world environment and a second orientation of an avatar in a virtual environment, the avatar corresponding to the user; determine an avatar adjustment value based on the dissonance; and apply the avatar adjustment value to the avatar model to change the second orientation.

18 Claims, 13 Drawing Sheets

(56) References Cited

U.S. PATENT DOCUMENTS

| | | |
|---|---|---|
| 2018/0003982 A1 | 1/2018 | Burns et al. |
| 2018/0095637 A1 | 4/2018 | Valdivia et al. |
| 2018/0144746 A1 | 5/2018 | Mishra et al. |
| 2018/0268589 A1* | 9/2018 | Grant ...................... G06F 3/017 |
| 2019/0172462 A1 | 6/2019 | Mishra et al. |
| 2019/0188895 A1 | 6/2019 | Miller, IV et al. |
| 2019/0220088 A1 | 7/2019 | Ishii et al. |
| 2020/0184987 A1 | 6/2020 | Kupryjanow et al. |
| 2020/0314483 A1* | 10/2020 | Rakshit .............. H04N 21/4318 |
| 2021/0092517 A1 | 3/2021 | Kulkarni et al. |
| 2021/0116983 A1 | 4/2021 | Hallberg et al. |
| 2022/0014815 A1* | 1/2022 | Browning .......... H04N 21/4394 |
| 2022/0309567 A1 | 9/2022 | Han |

OTHER PUBLICATIONS

International Searching Authority, "Written Opinion of the International Searching Authority," issued in connection with International Patent Application No. PCT/US2023/082972, issued on Apr. 9, 2024, 5 pages.

"A Method and Apparatus for Smart Auto-Mute of Conference Participants," IP.com Prior Art Database Technical Disclosure, May 1, 2014, 12 pages.

Gibaldi et al., "Solving Parallax Error for 3D Eye Tracking," ETRA '21: 2021 Symposium on Eye Tracking Research and Applications, May 2021, 4 pages.

* cited by examiner

US 12,449,896 B2

USER-TO-AVATAR ACTION MAPPING AND ADJUSTMENT

FIELD OF THE DISCLOSURE

This disclosure relates generally to presentation of avatars and, more particularly, to user-to-avatar action mapping and adjustment.

BACKGROUND

In virtual reality settings such as the metaverse, users create or select avatars. Actions the users make in the real world are mapped into the virtual environment and mimicked by their respective avatars.

BRIEF DESCRIPTION OF THE DRAWINGS

In general, the same reference numbers will be used throughout the drawing(s) and accompanying written description to refer to the same or like parts. The figures are not to scale.

DETAILED DESCRIPTION

In virtual environments such as, for example, the metaverse, users can represent themselves as avatars. A user may use head-mounted displays (HMDs) as portals to the virtual environment. HMDs include virtual reality (VR), augmented reality (AR), and/or mixed reality (MR) devices including headsets, goggles, glasses, etc. With HMDs, the location of the eyes of the user wearing the HMD relative to cameras and other sensors in the HMD is predictable. Thus, the user's avatar appears naturally oriented in the virtual environment.

Figure 1:
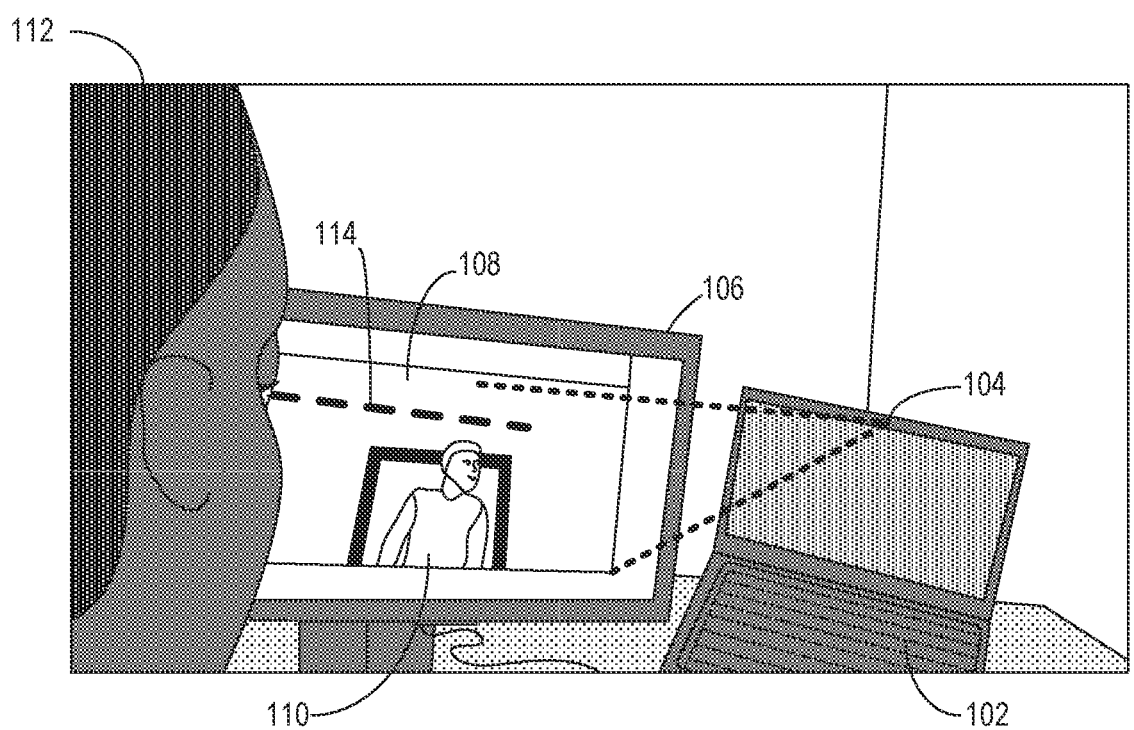
FIG. 1 is an illustration of a user in an environment with an avatar in a mis-oriented position.

In addition to HMDs, other electronic devices may be used as portals for virtual environments. For example, a personal computer (PC) may be used as a metaverse portal, alternatively or in addition to HMDs. With some PC setups, such as for example laptop computers with external displays and/or multi-display desktop computers, the location of the camera and/or other sensors may be offset from the display of the virtual environment. For example, FIG. 1 shows an example laptop computer 102 with an example camera 104 positioned adjacent to an example external display 106. An example virtual environment 108 is presented on the external display 106. An example avatar 110 of an example user 112 is presented in the virtual environment 108. The position or orientation of the avatar 110 is determined based on data gathered by the camera 104.

In the example of FIG. 1, the user's actual gaze 114 is to the external display 106. However, the camera 104 is positioned to the right of the external display 106. Therefore, the avatar 110 appears to be looking to the side, which is a mis-orientation. This is because the camera 104 on the laptop computer 102 is not aligned with the user 112 relative to the content of interest (i.e., the virtual environment 108). Similar issues exist in other scenarios such as, for example, with a desktop computer setup where an external camera may be placed on top of a monitor, or set to the side, etc.

Also, in virtual environments, avatars can look at each other and even make virtual eye contact, so it feels to the user that other users' avatars are making eye contact. Virtual eye contact is inconsistent or prevented when an avatar is mis-oriented.

In some virtual environments such as, for example, a metaverse session, if a user creates an unintentional input (e.g., scratches their nose or stands up to close a window, etc.) while immersed in the virtual environment, the user's avatar will reproduce the unintentional input or interaction. In some examples, the avatar reproduction of the unintentional action appears as a jolt or other incongruous action. The unintended movement of the avatar may cause confusion for other attendees of the virtual environment, as well as potential frustration for the user. There are many types of unintentional inputs including, for example, physical inputs like the user moving their body such as, for example, micro-gestures, broad movements, walking away from a PC presenting the virtual environment for a quick moment, etc. Unintentional inputs also include, for example, auditory inputs such as sneezing, yawning, coughing, etc. Unintentional inputs also include emotional input such as, for example, a user having an emotional output different than an emotion intended for the avatar. Unintentional inputs also include, for example, activity in the real-world environment of the user such as, for example, another person entering the field of view of a camera, exterior sounds, etc. Unintentional inputs also include, for example, a user operating multiple devices (e.g., dual monitors and/or cameras) some of which are not coupled to the virtual environment. The user may look away from the main monitor that has the camera installed to a secondary screen. For example, a user may glance at a smartwatch. Reproduction of the movement by the avatar may be unintended. In some examples, unintentional input may be a combination of different types of unintentional input.

Currently, there are no signifying alerts to allow temporary pause of sensor capture (e.g., "it looks like you're about to sneeze, would you like to pause your avatar control and/or mute?" or "it looks like you're walking away, would you like to pause your avatar control?"), nor are there reminders that a user may still be in a virtual collaboration experience, although the user might be multi-tasking and forget they are controlling their avatar. Thus, in current systems, all user activity is translated into an avatar action.

Figure 2:
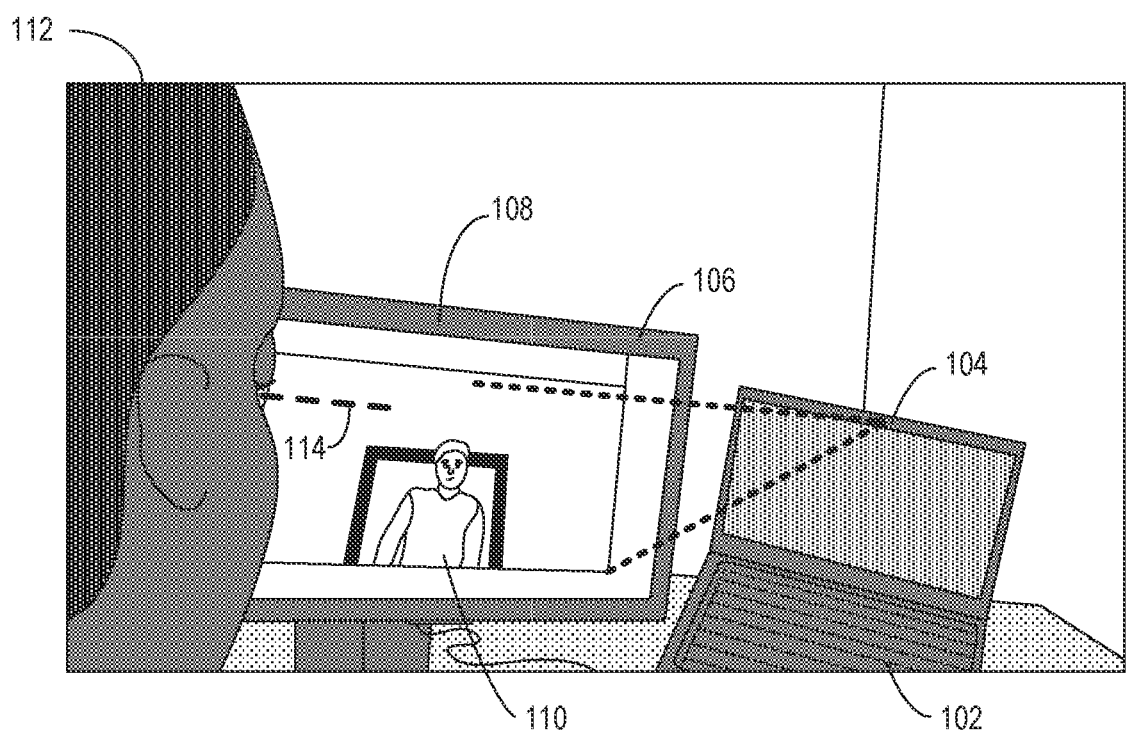
FIG. 2 is an illustration of the user in the environment of FIG. 1 with the avatar in a re-orientated position in accordance with teachings of this disclosure.

Examples disclosed herein improve the mapping of users to their avatars, including facial expressions and body movements. Examples disclosed herein include orientation correction for avatars where there is a camera offset to the user. For example, FIG. 2, shows the user 112 in the environment of FIG. 1 with the camera 104 offset to the external display 106 presenting the virtual environment 108. The user 112 is focused on the virtual environment 108, and the avatar 110 is orientated as the orientation of the user 112 to the virtual environment 108 despite the offset position of the camera 104 that gathers the user orientation data. Thus, the avatar 110 is reoriented to be consistent with the user's actual gaze of the virtual environment.

Examples disclosed herein correct the avatar's orientation in the application (the virtual environment), while accounting for multiple tasks the user may be doing on the computer 102 or in the environment near the computer 102. This includes capabilities to recognize user activity and then correct or otherwise adjust the orientation of the avatar within virtual content to be consistent with the activity of the user in the real world. In some examples, user activity is determined through the analysis of user gaze tracking, objects in the environment, and/or available digital content (e.g., content presented on one or more electronic devices). In some examples, the reorientation of the avatar is not limited to face and eyes but may be applied to the entire avatar model.

Examples disclosed herein also include dynamic management of intentional and unintentional user and environmental inputs for avatar reproduction of outputs in virtual environments such as, for example, the metaverse, virtual meetings, gaming, etc. Example disclosed herein also improve user experience and avatar control in the metaverse and other virtual environments by validating and allowing intentional inputs and eliminating unintentional inputs by leveraging available user presence intelligence via input and output data (e.g., data gathered via a camera, a microphone, a keyboard, a mouse, additional and/or alternative sensors etc.). Example disclosed herein also leverage pre-determined behavioral models (e.g., logged and categorized types of movements including, for example, an urgent standing up instance is unintentional, a sneeze is unintentional, etc.), Examples, disclosed herein establish a baseline or normal foundational behavior for comparison against unintentional inputs. Examples disclosed herein allow the user to block unintentional input. In some examples, users actively block unintentional input at the time of the event that is not intended to be translated to the avatar. In some examples, users pre-set events to block before the occurrence of the events.

Examples disclosed herein identify, categorize, and translate user action for visual and auditory reproduction by a corresponding avatar with high resolution control to correct mis-orientation and block unintentional actions.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real-world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

As used herein, the terms "consistent", "match", and "correlate" indicate a degree of compatibility or similarity. In some examples, the degree of similarity is within a threshold amount similarity such as, for example, ten percent. In some examples, the degree of similarity is higher such as, for example, within a threshold amount of one percent. In some examples, the degree of similarity is very high including, for example, exactly the same. In some examples, the terms are qualitative and indicate an agreement or consonance between two or more elements such as, for example, elements of a presentation or virtual environment. Opposite terms such as, for example, "inconsistent" or "dissonance" are used herein to indicate a degree of dissimilarity. Degrees of dissimilarity do not satisfy the threshold amount of similarity.

Figure 3:
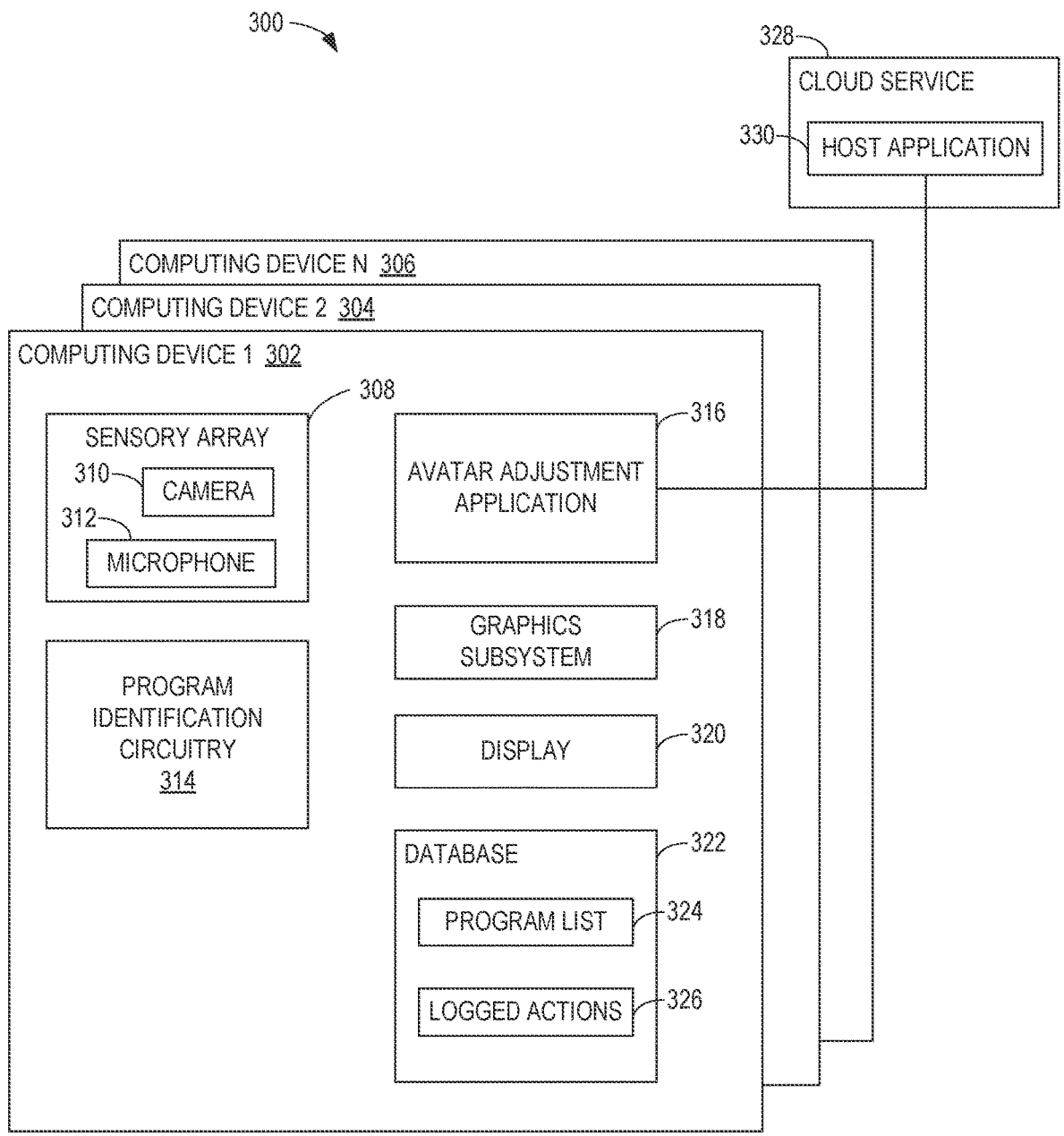
FIG. 3 is a block diagram of an example system including an example avatar adjustment application in accordance with teachings of this disclosure.

FIG. 3 is a block diagram of an example system 300 for user-to-avatar mapping and adjustment. The system 300 includes an example computing device 302. The computing device 302 is labeled "Computing Device 1" in FIG. 3. The example system 300 also includes one or more other computing devices 304 ("Computing Device 2"), 306 ("Computing Device N"). The system 300 may include any number of computing devices. The other computing device 304, 306 may include some or all the features of the computing device 302 shown in FIG. 3. The computing device 302 may be any device used to access and/or present a virtual environment and/or otherwise enable input and/or output of user activity. Example computing devices include HMDs, laptop PCs, desktop PCs, smartwatches, smartphones, tablets, external displays, smart mirrors, smart televisions, gaming consoles, and/or combinations of devices, etc.

The computing device 302 includes an example sensor array 308. The sensor array 308 includes an example camera 310 and an example microphone 312. The computing device 302 also includes example program identification circuitry 314, an example avatar adjustment application 316, an example graphics subsystem 318, an example display 320, and an example database 322. The example display 320 includes at least an example program list 324 and example logged actions 326. The system 300 also includes an example cloud service 328 and an example host application 330.

The sensor array 308 gathers data related to the user and the real-world environment. For example, the example camera 310 gathers visual data that can be used to identify or determine a position of the user, their orientation, gaze direction, face tracking, etc. The visual data gathered by the camera 310 also can be used to identify objects in the real world including, for example, an object held or otherwise near the user that could be an object of interest. In some examples, the camera 310 is an RGB camera. Additionally or alternatively, the sensor array 308 may include an infrared camera, a time of flight camera, a plurality of cameras, etc.

The microphone 312 gathers audio data. Audio also has a directional component. Thus, the audio data may also be used to identify or determine a position of the user and their orientation. In some examples, the microphone 312 includes directional microphones. In some examples, the sensor array 308 includes an array of microphones.

In other examples, the sensor array 308 includes more or fewer devices to gather data related to a user and/or real-world environment. For example, the sensor array 308 may include one or more of a gyroscope, an accelerometer, lidar sensors, e-field sensors, capacitive sensors, structured-light sensors, a vertical-cavity surface-emitting laser, and/or other types of positioning sensors. One or more of the sensors in the sensor array 308 may be integrated in one or more computers and/or other electronic devices and/or could be external peripherals for those computers and/or other electronic devices.

The program identification circuitry 314 identifies and tracks what applications or programs are in use on the computing device 302. In some examples, the program identification circuitry 314 identifies the screen buffer of contents. The program identification circuitry 314 stores the identified program list 324 in the database 322.

The avatar adjustment application 316 maintains and updates an avatar model for presenting an avatar in the virtual environment based on the data gathered via the sensor array 308 and program identification circuitry 314. Operation of the avatar adjustment application 316 is disclosed in greater detail below. In some examples the avatar adjustment application 316 communicates with the host application 330 of the cloud service 328. In such examples, one or more of the functionality and capabilities of the avatar adjustment application 316 may be distributed between the computing device 302 and the host application 330. In some examples, the host application 330 coordinates avatar adjustment applications across the computing devices 302, 304, 306. For example, different ones of the computing devices 302, 304, 306 may include different types of sensors that gather different data for use in the avatar model. In some examples, the host application 330 is in a non-cloud based server. In some examples, the host application 330 is edge-based. In some examples, the host application 330 is local to one or more of the computing device 302, 304, 306. In some examples, the host application 330 and avatar adjustment application 316 are integrated.

The graphics subsystem 318 builds the images of the avatar based on the avatar model of the avatar adjustment application 316. In some examples, the avatar model resides in the cloud service 328. In such examples, the computing device 302 and graphics subsystem 318 receive rendered frames from the cloud service 328. In some examples, the avatar is presented on the display 320.

Figure 4:
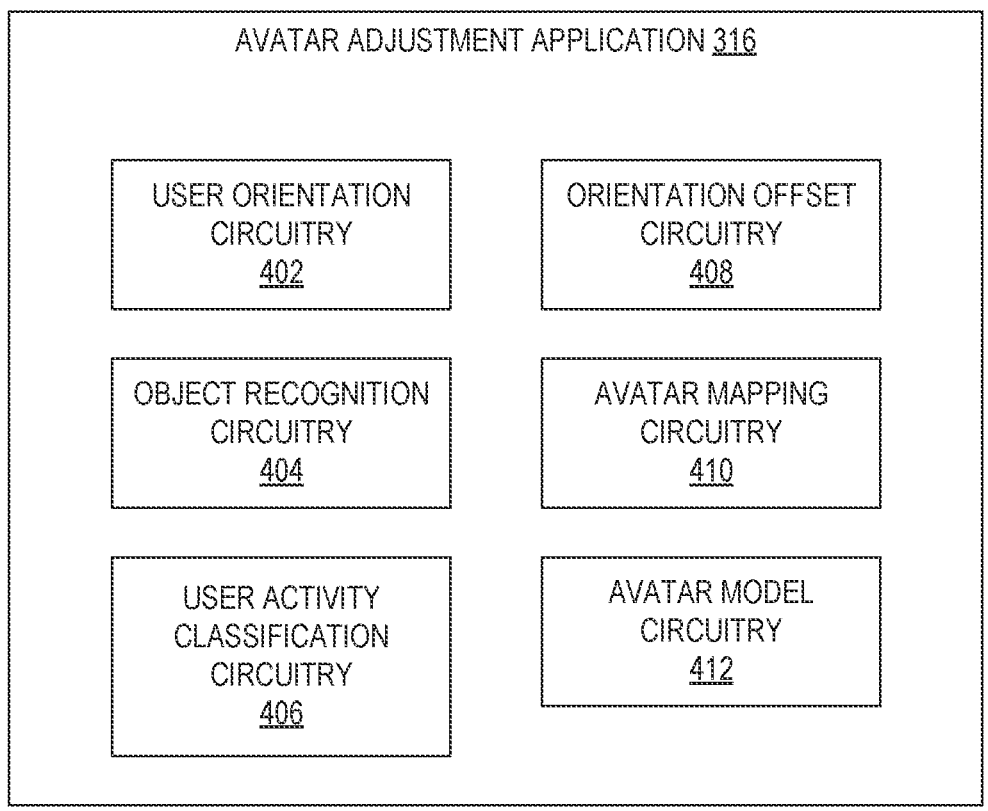
FIG. 4 is a block diagram of the avatar adjustment application of FIG. 3.

FIG. 4 is a block diagram of the avatar adjustment application 316 of FIG. 3. The avatar adjustment application 316 includes example user orientation circuitry 402, example object recognition circuitry 404, example user activity classification circuitry 406, example orientation offset circuitry 408, example avatar mapping circuitry 410, and example avatar model circuitry 412.

The user orientation circuitry 402 analyzes data from the sensor array 308 and program identification circuitry 314 to determine a position and orientation of a user. The user orientation circuitry 402 analyzes the visual data and tracks one or more parts of the user's body including, for example, one or more eyes, face, torso, arms, one or more fingers, etc. In some examples, the user orientation circuitry 402 tracks the user's voice by analyzing the audio data. The user orientation circuitry 402 also analyzes the program list 324 to identify content that appears on the display 320. The user orientation circuitry 402 uses the visual, audio, and/or program list data to identify a user's position and what the user is focused on.

In some examples, the user orientation circuitry 402 determines the location and orientation of relevant displays and peripherals of the user's system or environment based on the visual data and/or known specifications. For example, in an integrated laptop camera, the position of the camera is fixed, and the screen angle can be determined. However, an external display can be at various angles relative to the laptop camera. For accurate estimates of external screen location, various approaches may be used. For example, the user orientation circuitry 402 can analyze radio signals such as millimeter wave or ultra-wide band in a 5G specification that can be leveraged to obtain precise position information. Another example approach includes the use of eye reflection of displays. For example, a camera (e.g., the camera 310) facing the user can detect displays in the reflection of the user's eye. The user orientation circuitry 402 can determine a position of the user based on the visual data of the reflection. Another example approach uses wide field of view cameras to capture more visual data. In another example, with two or more displays, the user orientation circuitry 402 determines if a user is engaged with a window or program on one of the displays based on the program identification circuitry 314 determining that the program is displayed on that display (and has visibility over other programs running on the electronic device) and/or that there are user inputs to that display and/or program. The user orientation circuitry 402 estimates user gaze and/or face orientation with respect to the display presenting the program. In some examples, user orientation circuitry 402 maps the gaze and/or face orientation to specific coordinates on the display 320 as disclosed herein.

In some examples, the input from the camera 310 can be used to calibrate user gaze on screen or display content. For example, the user focuses on a dot moving around the display 320. The user orientation circuitry 402 tracks the eye gaze relative to the camera 310 and the display 320. The calibration can be used to map the position of the camera 310, as long as the camera 310 and display 320 do not move relative to each other.

The user's orientation with respect to the content of interest can be represented by a set of world coordinates ($X_W$, $Y_W$, $Z_W$). The user's orientation with respect to the position of the camera 310 can be represented by a set of camera image coordinates ($X_C$, $Y_C$, $Z_C$). In some examples, capturing or determining the user orientation involves transforming from the world coordinate system to the camera image coordinate system.

The object recognition circuitry 404 determines the presence of an object based on the visual data. The recognized object may be used, in some examples, for assessing user activity. For example, some objects in the real world are objects the user intends to interact with and, therefore, are relevant to the mapping of the user action to the avatar. In some examples, the object recognition circuitry 404 can also recognize the location and orientation of different electronic devices, displays, and/or peripherals, which can be used in determining the user orientation.

The user activity classification circuitry 406 determines the action of the user based on the audio, visual, program tracking, and/or orientation. For example, the user activity classification circuitry 406 can determine if the user is looking at the display 320, if the user if looking at another device, if the user is looking at a device that is not coupled to the virtual environment, if the user sneezed, if the user yawned, if the user's head is oriented toward or away from the display 320, if the user is holding an object, if the user is looking at an object, if the user is speaking, if the user is engaged, if the user makes a quick motion, if the user temporarily looks away from the display 320, and other actions or combinations of actions.

In some examples, the user activity classification circuitry 406 determines, classifies, or categorizes the action as intentional or unintentional. In some examples, the user activity classification circuitry 406 accessed the logged actions 326 in the database 322 and assesses if an action is logged as intentional or unintentional. For example, a sneeze may be logged as unintentional. A thumbs up gesture or a hand wave may be logged as intentional. An orientation of the head toward the display 320 showing the virtual environment may be logged as intentional. A whisper may be logged as unintentional. A sigh may be logged as unintentional. In some examples, the user sets or defines certain actions as intentional or unintentional. In some examples, the user activity classification circuitry 406 learns an action is intentional or unintentional based on a history of the user activity. Artificial intelligence including, for example, machine learning technologies can be implemented by the user activity classification circuitry 406 to learn intentional or unintentional classifications of actions.

In some examples, the user activity classification circuitry 406 accesses sources of contextual data to determine if an action is intentional or unintentional. Sources of contextual data include, for example, current user dialogue, prior conversations, background audio, a level of background ambient noise, other audio data, the setting of the virtual environment, a time of day, a connectivity of a device to the virtual environment, a position of an object, other visual data, a presence or operating mode of a program on a device, and other sources from which a context of the real world or virtual environment can be assessed by the user activity classification circuitry 406.

In some examples, the user activity classification circuitry 406 determines if a user's audio activity is consistent with the context. For example, the user activity classification circuitry 406 analyzes the audio data and assesses if the audio is consistent with the context of the virtual environment. If the user activity classification circuitry 406 determines the audio is consistent with the context, the action is classified as intentional. If the user activity classification circuitry 406 determines that the audio is not consistent with the context, the action is classified as unintentional. In some examples, if the user activity classification circuitry 406 determines that the user action is a sneeze, a sigh, a cough, a change in topic of a conversation, etc., the user activity classification circuitry 406 classifies the action as unintentional. In some examples, if the user activity classification circuitry 406 determines that the user action is conversation consistent with the topic of a current or prior conversation, the user activity classification circuitry 406 determines that the user action is intentional. In some examples, some words may trigger the user activity classification circuitry 406 to classify an action as intentional or not intentional. For example, a user saying the name of another avatar in the virtual environment may be classified as intentional, while the user saying a name not related to anything in the virtual environment may be classified as unintentional.

In some examples, audio activity may be outside of the user's control. For example, background noise or sounds in the real-world environment could be introduced as audio data that the user cannot control. The user activity classification circuitry 406 analyzes the audio data whether the source of the audio data is the user or an outside source to determine if the audio is consistent with the context of the virtual environment as disclosed above. Unintentional audio data is categorized as an unintentional action and not reproduced or otherwise fixed in virtual environment. This determination of the unintentional action based on audio data may also be used by the user activity classification circuitry 406 to classify reactionary behaviors as unintentional. For example, a loud bang in the background of the real-world environment may increase the likelihood of an unintentional physical input or behavior by the user (e.g., a jolt or sudden head turn). The user activity classification circuitry 406 can classify the physical action as unintentional based on the related audio data being categorized as an unintentional action.

In some examples, the user activity classification circuitry 406 determines if a user has turned attention to a device that is not coupled to the virtual environment. Devices are coupled to the virtual environment if the device can be used to input or output data to or from the virtual environment. For example, a device presenting a display of the virtual environment to the user is connected to the virtual environment. A device measuring a movement from the user that is translatable to an avatar is a device that is connected to the virtual environment. A device that does not gather data for use in the virtual environment or present aspects of the virtual environment is a device that is not connected to the virtual environment. If the user activity classification circuitry 406 determines the user attention has remained with a device connected to the virtual environment or turned to another device connected to the virtual environment, the action is classified as intentional. If the user activity classification circuitry 406 determines that the user attention has turned to a device not connected to the virtual environment, the action is classified as unintentional. For example, if the user activity classification circuitry 406 determines that a user looked at a watch momentarily, and the watch is not connected to the virtual environment, the user activity classification circuitry 406 may classify the action as unintentional. If the user activity classification circuitry 406 determines that the user action is a move of a head orientation from a first display to a second display, and both displays are connected to the virtual environment, the user activity classification circuitry 406 may classify the action as intentional.

In some examples when the action is a movement, the user activity classification circuitry 406 determines if the action is consistent with the context of the virtual environment. If the user activity classification circuitry 406 determines the movement is consistent with the context, the action is classified as intentional. If the user activity classification circuitry 406 determines that the movement is not consistent with the context, the action is classified as unintentional. For example, if the user activity classification circuitry 406 determines that the action is a quick head turn away from the display of the virtual environment, the user activity classification circuitry 406 may classify the action as unintentional action. If the user activity classification circuitry 406 determines that action is a head movement from a sneeze, the user activity classification circuitry 406 may classify the action as unintentional. If the user activity classification circuitry 406 determines that the movement is a position or orientation of the head or face of the user that is offset or misaligned with the display of the virtual environment, the user activity classification circuitry 406 may classify the action as unintentional. If the user activity classification circuitry 406 determines the action is clapping and the context of the virtual environment is a game, the user activity classification circuitry 406 may classify the action as intentional. If the user activity classification circuitry 406 determines the action is bending down out of the field of view of the camera 310 and the context of the virtual environment is a game, the user activity classification circuitry 406 may classify the action as unintentional. If the user activity classification circuitry 406 determines the action is standing up to close a window and there is no window in the virtual environment, the user activity classification circuitry 406 may classify the action as unintentional.

In some examples, movement activity may be outside of the user's control. For example, movements of people or objects in the background in the real-world environment could be introduced as movement data that the user cannot control. The user activity classification circuitry 406 analyzes the movement data whether the source of the movement data is the user or an outside source to determine if the movement is consistent with the context of the virtual environment as disclosed above. Unintentional movement data is categorized as an unintentional action and not reproduced or otherwise fixed in virtual environment. This determination of the unintentional action based on movement data may also be used by the user activity classification circuitry 406 to classify reactionary behaviors as unintentional. For example, another person or animal moving in the background of the real-world environment may increase the likelihood of an unintentional audio input by the user (e.g., speaking to the person or animal). The user activity classification circuitry 406 can classify the audio action as unintentional based on the related movement data being categorized as an unintentional action.

In some examples, the action is an emotion. The user activity classification circuitry 406 can identify an emotion based on, for example, a facial expression, an auditory tone, etc.). If the user activity classification circuitry 406 determines the emotion is consistent with the context, the action is classified as intentional. If the user activity classification circuitry 406 determines that the emotion is not consistent with the context, the action is classified as unintentional. If the emotion is anger but the virtual environment is a business meeting, the user activity classification circuitry 406 may classify the action as unintentional. In some examples, the user can pre-set a desired or target emotional state. The user activity classification circuitry 406 compares the current emotion of the user with the desired or target emotional state. If the user emotion matches the target emotional state, the user activity classification circuitry 406 may classify the action as intentional. If the user emotion does not match the target emotional state, the user activity classification circuitry 406 may classify the action as unintentional.

If the activity classification circuitry 406 determines an action is intentional, the action will be incorporated into the avatar model for translation or reproduction by the avatar. With actions that are related to head or face orientation, the orientation offset circuitry 408 determines if there is an orientation offset, inconsistency, or dissonance between the user's head position in the real world and the position of the avatar in the virtual world. A dissonance is a perceivable and/or unnatural difference of user state (user position or orientation) versus an avatar reproduction (avatar position or orientation). For example, the user may be speaking to other members in a virtual environment (e.g., during a meeting presented in the metaverse), and could be interrupted or distracted to a second screen located to the left by 25 degrees from main screen and camera. If the user continues to talk while looking at the second screen, the avatar representing the user in the virtual environment would have its face awkwardly turned 25 degrees. With the examples disclosed herein, the dissonance is accounted for, and the avatar maintains its focus (e.g., the orientation or position of its head, face, eyes) on the members within the virtual environment.

In some examples, the dissonance is caused by an offset between the camera 310 and the display 320 (or other display that is the focus of the user's attention). The offset is due to the camera 310 being positioned at an angle relative to the display 320. The orientation offset circuitry 408 makes two estimates of user orientation, one to the camera 310 and one to the content of interest in the activity (e.g., the display 320). As noted above, the estimates of orientation can be provided as sets of coordinates. As disclosed above, the user's orientation with respect to the content of interest can be represented by the set of real world coordinates ($X_W$, $Y_W$, $Z_W$), and the user's orientation with respect to the position of the camera 310 can be represented by a set of camera image coordinates ($X_C$, $Y_C$, $Z_C$). The avatar's orientation in the virtual environment can be represented by a set of target coordinates ($X_T$, $Y_T$, $Z_T$).

The orientation offset circuitry 408 determines if the orientation of the avatar ($X_T$, $Y_T$, $Z_T$) matches or is consistent with the orientation of the user with respect to the content of interest ($X_W$, $Y_W$, $Z_W$). If the orientation of the avatar ($X_T$, $Y_T$, $Z_T$) does not match or is not consistent with the orientation of the user with respect to the content of interest ($X_W$, $Y_W$, $Z_W$), the orientation offset circuitry 408 determines a difference between the orientation of the user with respect to the content of interest ($X_W$, $Y_W$, $Z_W$) and the orientation of the user with respect to the camera image coordinates ($X_C$, $Y_C$, $Z_C$).

The avatar model circuitry 412 updates the avatar model based on difference between the orientation of the user with respect to the content of interest ($X_W$, $Y_W$, $Z_W$) and the orientation of the user with respect to the camera image coordinates ($X_C$, $Y_C$, $Z_C$). The avatar mapping circuitry 410 encodes or maps the user action to the avatar and adjusts a position or orientation of the avatar based on the avatar adjustment. In some examples, a local system receives inputs from devices such as, for example, gamepads and maps the inputs into a Human Interface Device (HID) input stream. In some examples, the HID data is streamed to the host application 330. Thus, in some examples, avatar inputs are corrected for orientation before being put into the HID stream. Thus, in some examples, a compressed data set is transmitted to the servers and/or host application 330 as compared to transmitting large sets of frames.

Figure 5:
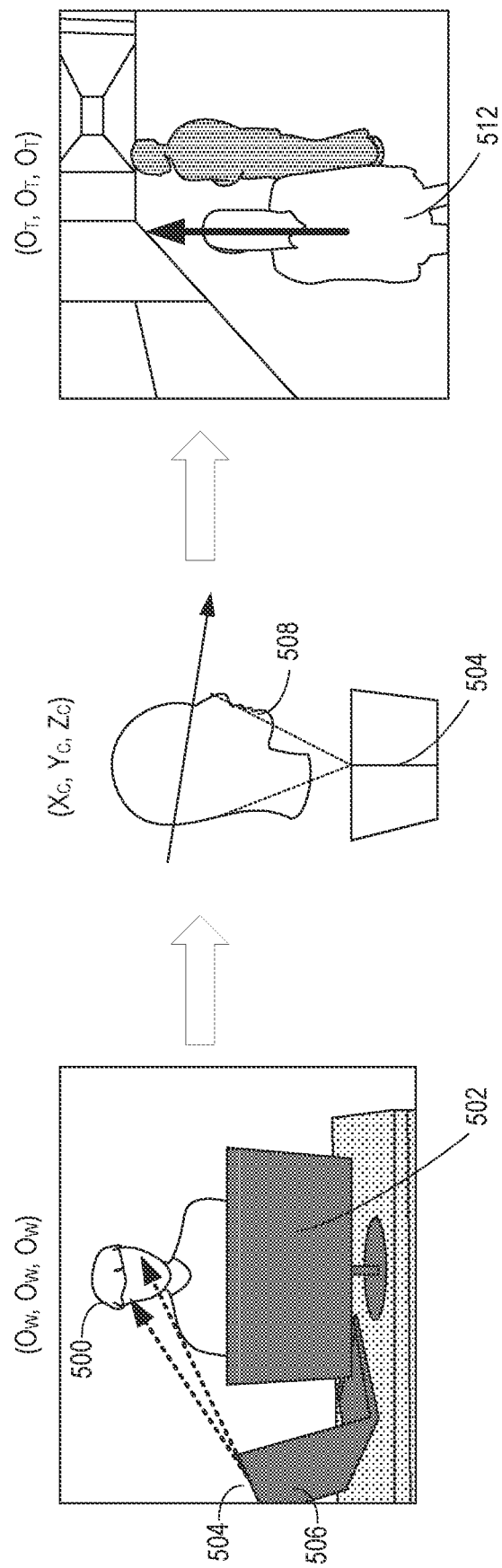
FIG. 5 is an illustration of an example correlation of example coordinate systems used by avatar adjustment application of FIG. 3 with a user face in a first position.

FIG. 5 is an illustration of an example correlation of example coordinate systems used by the avatar adjustment application 316 of FIG. 3 with a user face in a first position. As shown in FIG. 5, a user 500 is oriented facing the content of interest (the virtual environment) displayed on a first electronic device 502. The user's orientation directly in front of the content of interest leads the world coordinates to be ($0_W$, $0_W$, $0_W$).

A camera 504 on a second electronic device 506 is offset from the user 500. In this example, the camera image 508 shows the user orientated to the right. This leads the camera image coordinates to be ($X_C$, $Y_C$, $Z_C$). The positional offset between the camera 504 and the first display 502 showing the content of interest has been accounted for in the avatar modeling by the avatar model circuitry 412. Thus, the avatar mapping circuitry 410 causes the rendering of an avatar 512 oriented in the same position as the user in the real word. Thus, the target coordinates are ($0_T$, $0_T$, $0_T$), matching or are consistent with those of the world coordinates.

Figure 6:
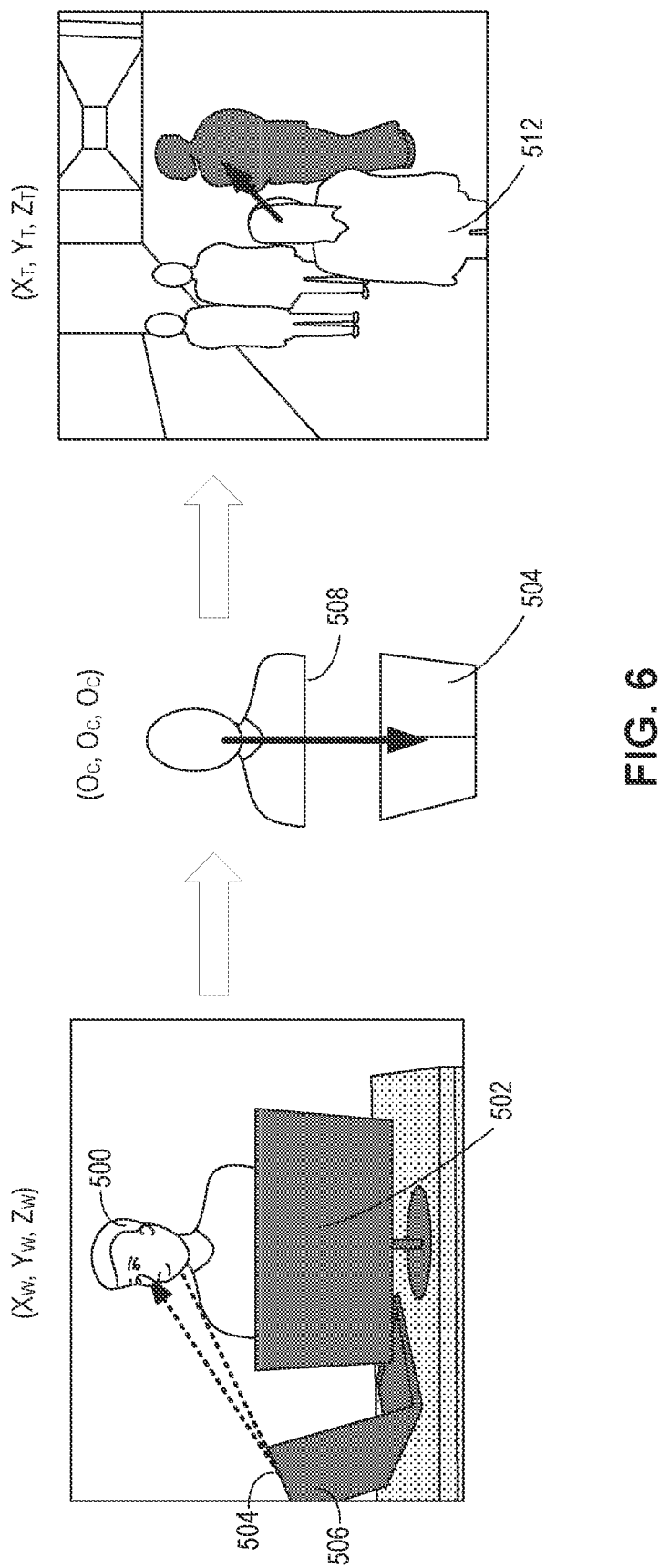
FIG. 6 is an illustration of an example correlation of the coordinate systems used by avatar adjustment application of FIG. 3 with the user face in a second position.

FIG. 6 is an illustration of the correlation of the coordinate systems used by the avatar adjustment application 316 of FIG. 3 with the user face in a second position as the user 500 moves. As shown in FIG. 6, the user 500 moved and is oriented at an angle relative to the content of interest (the virtual environment) displayed on the first electronic device 502. The user's orientation facing away from the content of interest leads the world coordinates to be ($X_W$, $Y_W$, $Z_W$).

In this example, the user 500 is facing the camera 504. Thus, the camera image 508 shows the user orientated directly in line with the camera 504. This leads the camera image coordinates to be ($0_C$, $0_C$, $0_C$). Because the positional offset between the camera 504 and the first display 502 showing the content of interest has been accounted for in the avatar modeling by the avatar model circuitry 412, the avatar mapping circuitry 410 causes the rendering of an avatar 512 oriented in the same position as the user in the real word (and, thus, looking toward the side). Thus, the target coordinates are ($X_T$, $Y_T$, $Z_T$), matching or are consistent with those of the world coordinates.

In some examples, the avatar adjustment application 316 takes into account an estimation of whether a user is interacting with a real object instead of looking at the content of interest in the virtual environment. If a user is interacting with a real object in the real world, the avatar adjustment application 316 will not assess user and avatar orientation consistency or dissonance.

Also, in some examples, the avatar model circuitry 412 adjusts the direction of audio data so that the play back of audio (e.g., surround sound audio) correlates with or is consistent with the corrected avatar orientation.

In some examples, the avatar model circuitry 412 uses three-dimensional avatar models. And in some examples, the avatar model circuitry 412 algorithms to supplement and fill in non-visible parts of the user to map to the avatar model (e.g., second eye, or other side of face, etc.).

In some examples, the avatar adjustment application 316 operates the user-to-avatar action mapping and adjustment for multiple avatars for multiple users within a camera field of view. The multiple applications of mapping and adjustment can occur simultaneously with and/or independently of each other.

In some examples, the system 300 may have two or more cameras.

To orient the avatar, a camera with a fixed position relative to the content of interest would be the higher priority. For example, a smart display with an integrated web cam would track user gaze on the content of a screen of the smart display. In some examples, a pan of a virtual camera on a display is used to map a swivel of an avatar.

In some examples, multiple microphone inputs (e.g., from multiple audio devices) or head related transfer function (HRTF)) data from low energy (LE) audio can be further used or optimized to redirect the avatar orientation.

If the activity classification circuitry 406 determines an action is unintentional, the action will be blocked. A blocked action is not mapped to the avatar. Instead, the avatar model circuitry determines if the avatar will maintain a prior position (e.g., momentarily freeze) or if the block input will be replaced with alternative input.

If the unintentional input is a mis-oriented head position, the replacement input is determined based on the avatar adjustment mechanisms disclosed above. If the unintentional action is a different type of unintentional action other than a head orientation, alternative input is obtained. For example, the alternative input can be a user-based replacement input in which the user selects what the alternative input will be. For example, if the user's unintentional action is an angry emotion, the user can select (or pre-select) that the replacement input to map the avatar is a happy emotion. In another example, the user can select that their avatar pace back and forth during as the alternative input until the unintentional action is complete.

In some examples, the alternative input can be character-based input. For example, the avatar model circuitry 412 can select alternative input for the avatar mapping circuitry 410 to map to a user's avatar during an unintentional action that matches the character of the avatar. For example, a dragon avatar may breathe fire during an unintentional action. In some examples, the alternative input is selected and/or altered so the avatar appears to naturally transition back to a user-to-avatar mapping when the unintentional action is complete.

Because the avatar adjustment application 316 blocks or prevents unintentional actions from being processed and mapped to an avatar, users of avatars in virtual environments will not experience unintended actions or interruptions.

FIG. 4 is a block diagram of the avatar adjustment application 316 to do user-to-avatar mapping and adjustment. The avatar adjustment application 316 of FIG. 4 may be instantiated (e.g., creating an instance of, bring into being for any length of time, materialize, implement, etc.) by processor circuitry such as a central processing unit executing instructions. Additionally or alternatively, the avatar adjustment application 316 of FIG. 4 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 4 may, thus, be instantiated at the same or different times. Some or all of the circuitry may be instantiated, for example, in one or more threads executing concurrently on hardware and/or in series on hardware. Moreover, in some examples, some or all of the circuitry of FIG. 4 may be implemented by microprocessor circuitry executing instructions to implement one or more virtual machines and/or containers.

Figure 7:
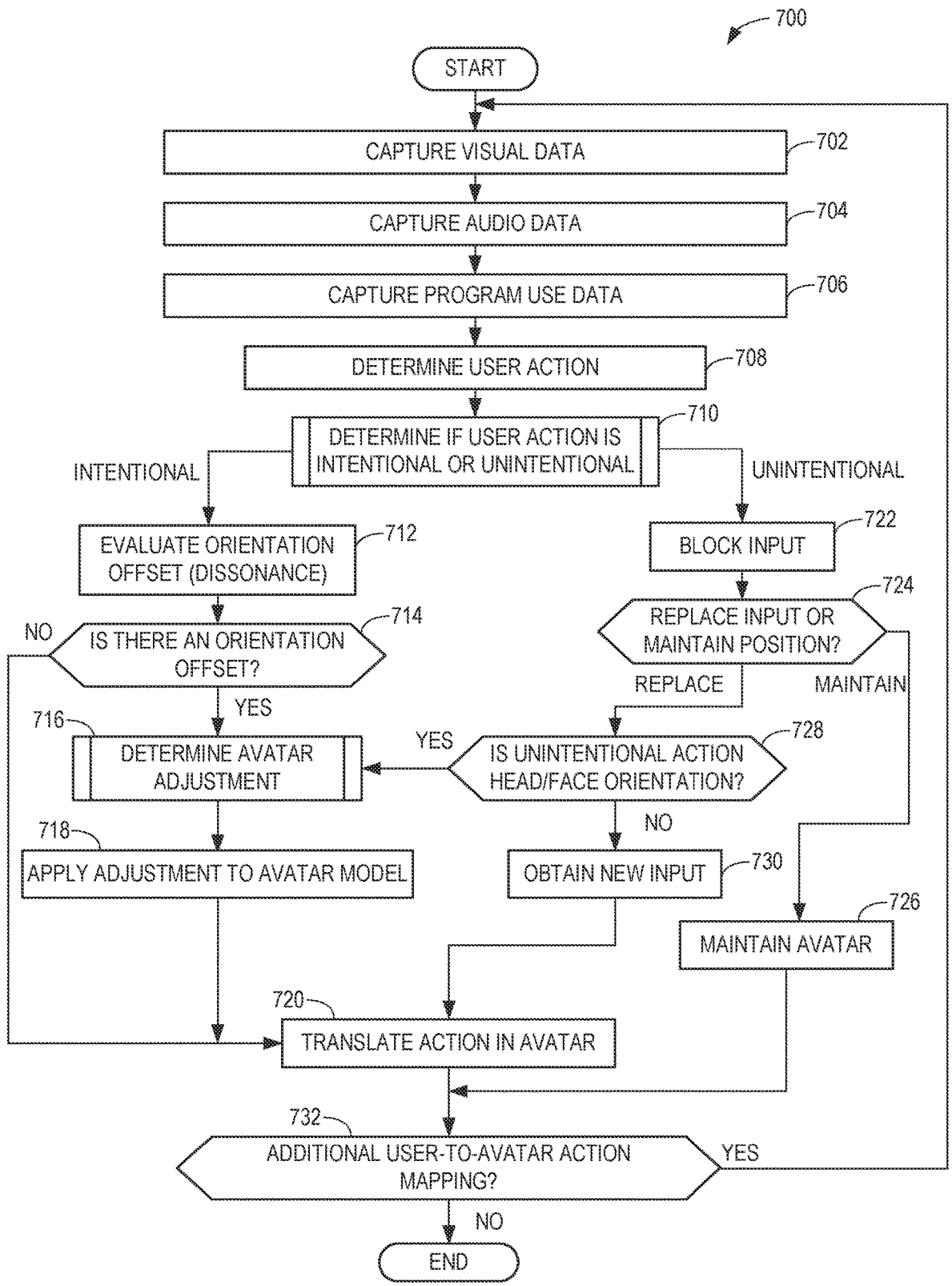
FIGS. 7-9 are flowcharts representative of example machine readable instructions and/or example operations that may be executed by example processor circuitry to implement the avatar adjustment application of FIG. 3.
Figure 8:
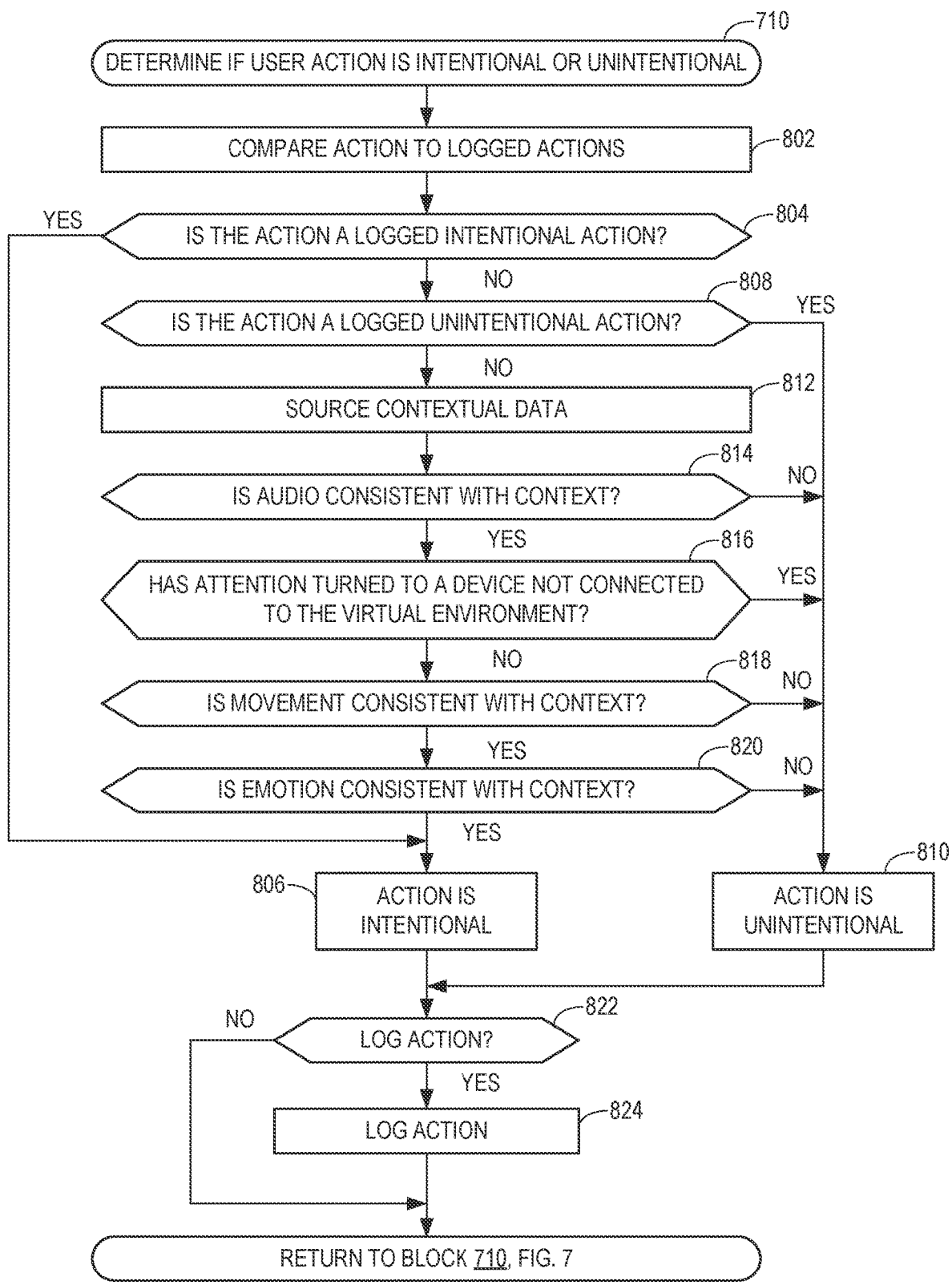
Figure 9:
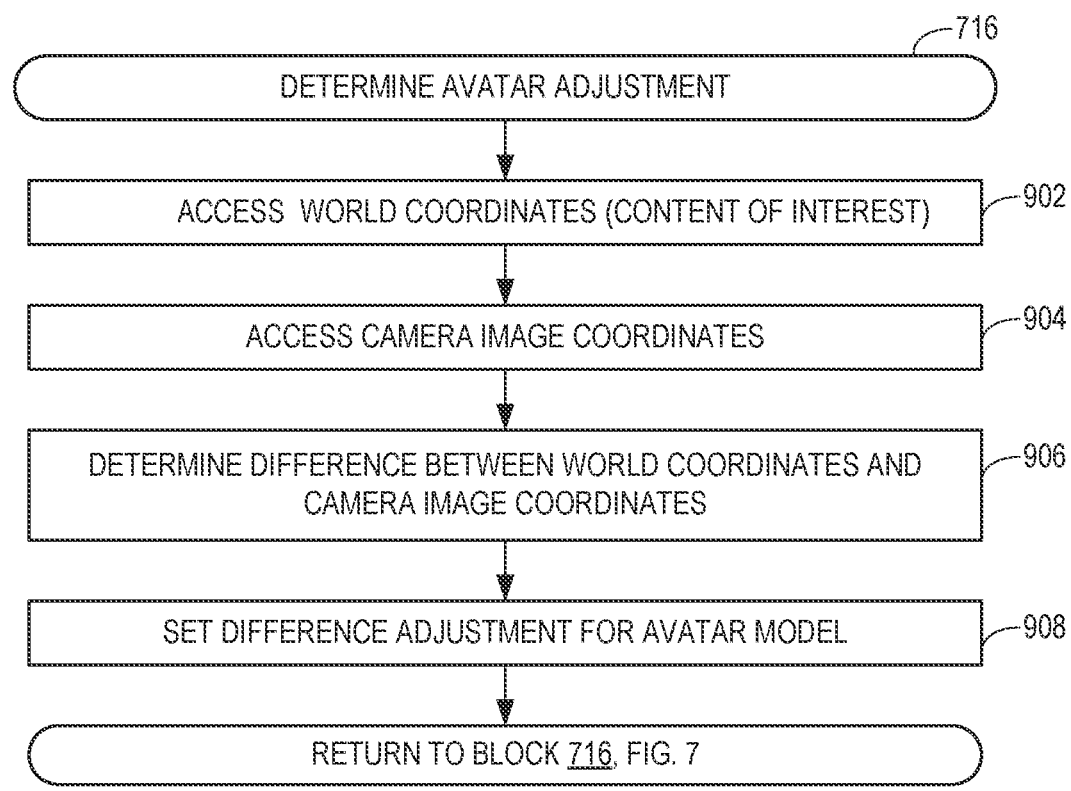

In some examples, the program identification circuitry 314 is instantiated by processor circuitry executing program identification instructions and/or configured to perform operations such as those represented by the flowcharts of FIGS. 7-9. In some examples, the user orientation circuitry 402 is instantiated by processor circuitry executing user orientation instructions and/or configured to perform operations such as those represented by the flowcharts of FIGS. 7-9. In some examples, the objection recognition circuitry 404 is instantiated by processor circuitry executing object recognition instructions and/or configured to perform operations such as those represented by the flowcharts of FIGS. 7-9. In some examples, the user activity classification circuitry 406 is instantiated by processor circuitry executing user activity classification instructions and/or configured to perform operations such as those represented by the flowcharts of FIGS. 7-9. In some examples, the orientation offset circuitry 408 is instantiated by processor circuitry executing orientation offset instructions and/or configured to perform operations such as those represented by the flowcharts of FIGS. 7-9. In some examples, the avatar mapping circuitry 410 is instantiated by processor circuitry executing avatar mapping instructions and/or configured to perform operations such as those represented by the flowcharts of FIGS. 7-9. In some examples, the avatar model circuitry 402 is instantiated by processor circuitry executing avatar model instructions and/or configured to perform operations such as those represented by the flowcharts of FIGS. 7-9.

In some examples, the apparatus includes means for mapping user-to-avatar action. For example, the means for mapping may be implemented by the avatar adjustment application 316. In some examples, the avatar adjustment application 316 may be instantiated by processor circuitry such as the example processor circuitry 1012 of FIG. 10. For instance, the avatar adjustment application 316 may be instantiated by the example microprocessor 1100 of FIG. 11 executing machine executable instructions such as those implemented by at least blocks 710-732 of FIG. 7 and the blocks of FIGS. 8 and 9. In some examples, the avatar adjustment application 316 may be instantiated by hardware logic circuitry, which may be implemented by an ASIC, XPU, or the FPGA circuitry 1200 of FIG. 12 structured to perform operations corresponding to the machine readable instructions. Additionally or alternatively, the avatar adjustment application 316 may be instantiated by any other combination of hardware, software, and/or firmware. For example, the avatar adjustment application 316 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the avatar adjustment application 316 of FIG. 3 is illustrated in FIG. 4, one or more of the elements, processes, and/or devices illustrated in FIG. 4 may be combined, divided, re-arranged, omitted, eliminated, and/or implemented in any other way. Further, the example program identification circuitry 314, the example user orientation circuitry 402, the example object recognition circuitry 404, the example user activity classification circuitry 406, the example orientation offset circuitry 408, the example avatar mapping circuitry 410, example avatar model circuitry 412, and/or, more generally, the example avatar adjustment application 316 of FIGS. 3 and 4, may be implemented by hardware alone or by hardware in combination with software and/or firmware. Thus, for example, any of the example user orientation circuitry 402, the example object recognition circuitry 404, the example user activity classification circuitry 406, the example orientation offset circuitry 408, the example avatar mapping circuitry 410, example avatar model circuitry 412, and/or, more generally, the example avatar adjustment application 316, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example avatar adjustment application 316 of FIG. 4 may include one or more elements, processes, and/or devices in addition to, or instead of, those illustrated in FIG. 4, and/or may include more than one of any or all of the illustrated elements, processes and devices.

Flowcharts representative of example machine readable instructions, which may be executed to configure processor circuitry to implement avatar adjustment application 316 of FIG. 4, are shown in FIGS. 7-9. The machine readable instructions may be one or more executable programs or portion(s) of an executable program for execution by processor circuitry, such as the processor circuitry 1012 shown in the example processor platform 1000 discussed below in connection with FIG. 10 and/or the example processor circuitry discussed below in connection with FIGS. 11 and/or 12. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 7-9, many other methods of implementing the example avatar adjustment application 316 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 7-9 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 7 is a flowchart representative of example machine readable instructions and/or example operations 700 that may be executed and/or instantiated by processor circuitry to map real world actions of a user to an avatar in a virtual environment. The machine readable instructions and/or the operations 700 of FIG. 7 include the sensor array 308 including the camera capturing visual data (block 702). The sensor array 308 including the microphone 312 captures audio data (block 704). Also, the program identification circuitry 314 capture program user data, which indicates which programs are in use on devices operated by the user (block 706).

The operations 700 also include the user activity classification circuitry 406 determining if a user action is intentional or not intentional (block 710). Further details regarding processes for determining if a user action is intentional or not intentional are disclosed above and in connection with FIG. 8. If and/or when the user activity classification circuitry 406 determines that an action is intentional (block 710: INTENTIONAL), the orientation offset circuitry 408 evaluates an orientation offset or dissonance between a position or orientation of a user in the real world and the position or orientation of a corresponding avatar in the virtual environment (block 712). The orientation offset circuitry 408 determines if there is an offset between the position or orientation of a user in the real world and the position or orientation of a corresponding avatar in the virtual environment (block 714). For example, the orientation offset circuitry 408 may identify that there is an offset between the position or orientation of a user in the real world and the position or orientation of a corresponding avatar in the virtual environment when the difference between the position or orientation of a user in the real world and the position or orientation of a corresponding avatar in the virtual environment is greater than or otherwise satisfies a threshold difference. Likewise, the orientation offset circuitry 408 may identify that there is no offset between the position or orientation of a user in the real world and the position or orientation of a corresponding avatar in the virtual environment when the difference between the position or orientation of a user in the real world and the position or orientation of a corresponding avatar in the virtual environment is less than or otherwise does not satisfy a threshold difference.

If and/or when the orientation offset circuitry 408 determines that there is an offset between the position or orientation of a user in the real world and the position or orientation of a corresponding avatar in the virtual environment (block 408: YES), the avatar model circuitry 412 determines an avatar adjustment (block 716). Further details regarding processes for determining an avatar adjustment are disclosed above and in connection with FIG. 9. The avatar adjustment includes the values or calculations for how to change a position or orientation of the avatar to align or otherwise correspond to the position or orientation of the user in the real world. With the avatar adjustment determined, the avatar model circuitry 412 applies the adjustment to the avatar model (block 718). The avatar mapping circuitry 410 encodes or translates the action of the user (i.e., the action determined in block 708) with the avatar adjustment to the avatar (block 720). The process 700 includes the user activity classification circuitry 406 of the avatar adjustment application 316 determining if there is additional user-to-avatar action to map (block 732).

If and/or when the orientation offset circuitry 408 determines that there is not an offset between the position or orientation of a user in the real world and the position or orientation of a corresponding avatar in the virtual environment (block 408: NO), the avatar mapping circuitry 410 encodes or translates the action of the user (i.e., the action determined in block 708) with the avatar adjustment to the avatar (block 720). The process 700 includes the user activity classification circuitry 406 of the avatar adjustment application 316 determining if there is additional user-to-avatar action to map (block 732).

If and/or when the user activity classification circuitry 406 determines that an action is unintentional (block 710: UNINTENTIONAL), the avatar model circuitry 412 blocks the input (block 722). In other words, the action determined at block 708 is not processed for mapping to the avatar. The avatar model circuitry 412 determines whether to replace the input or maintain the position of the avatar (block 724). For example, the actions of the avatar can be replaced with alternative action that does not include a mapping of the unintentional action or, in some examples, the avatar can be maintained (e.g., pause). If and/or when the avatar model circuitry 412 determines that the avatar position is to be maintained (block 724: MAINTAIN), the avatar mapping circuitry 410 maintains the avatar in the same state (block 726). The process 700 includes the user activity classification circuitry 406 of the avatar adjustment application 316 determining if there is additional user-to-avatar action to map (block 732).

If and/or when the avatar model circuitry 412 determines that the avatar position is to be replaced (block 724: REPLACE), the user activity classification circuitry 406 determines if the unintentional action is a head/face orientation (block 728). If and/or when the user activity classification circuitry 406 determines that the unintentional action is a head/face orientation (block 728: YES), the example process 700 continues with the avatar model circuitry determining the avatar adjustment (block 716).

If and/or when the user activity classification circuitry 406 determines that the unintentional action is not a head/face orientation (block 728: NO), the avatar model circuitry 412 obtains new input (block 730). For example, the example avatar model circuitry 412 may obtain alterative input such as, for example, an avatar pacing back and forth, for mapping to the avatar during the duration of the unintentional action. In some examples, to obtain new input, the avatar adjustment application 316 prompts or asks for user input and/or preferences. In some examples, the avatar adjustment application 316 prompts the user through a visual user interface prompt such as, for example, on a screen. Also, in some examples, a user can give a vision-based reply such as, for example, by a gesture. In some examples, the avatar adjustment application 316 prompts the user through an audio request. Also, in some examples, a user can give an audio-based reply such as, for example, by a voice command.

In some examples, the new input may be an override command from the user that action perceived as an unintentional input was intentional. In other words, to obtain new input (block 730), the avatar adjustment application 316 may prompt the user for new input or other preference data. In this example, the user can override, correct, or adjust the algorithm if the user exhibited behavior (or preemptively knows they will be doing a behavior) that may be seen as unintentional by the system or algorithm but behavior that they want to have generated directly into their active avatar. For example, a user could want a fake sneeze or a shocked-and-stand-up-out-of-their-chair moment reproduced by their avatar. In some examples, the new input of this nature is as an override control. In some examples the override control is accessible at all time. In some examples, the override control is accessible once the system begins to sense an unintentional behavior. In some examples, the override control is available in real-time. The process 700 continues with the avatar mapping circuitry 410 encodes or translates the new input action (i.e., the input of block 730) to the avatar (block 720).

If and/or when the user activity classification circuitry 406 of the avatar adjustment application 316 determines that there is additional user-to-avatar action to map (block 732: YES), the example process 700 proceeds from block 702. If and/or when the user activity classification circuitry 406 of the avatar adjustment application 316 determines that there is no additional user-to-avatar action to map (block 732: YES), the example process 700 ends.

FIG. 8 is a flowchart representative of example machine readable instructions and/or example operations 710 (of FIG. 7) that may be executed and/or instantiated by processor circuitry to determine if a user action is intentional or unintentional. The example operations 710 include the user activity classification circuitry 406 comparing the action (i.e., the action identified in block 708 of FIG. 7) to logged actions (block 802). The user activity classification circuitry 406 determines if the action is a logged intentional action (block 804). If and/or when the user activity classification circuitry 406 determines that the action is a logged intentional action (block 804: YES), the user activity classification circuitry 406 identifies the action as intentional (block 806).

If and/or when the user activity classification circuitry 406 determines that the action is a not logged intentional action (block 804: NO), the user activity classification circuitry 406 determines if the action is a logged unintentional action (block 808). If and/or when the user activity classification circuitry 406 determines that the action is a logged unintentional action (block 808: YES), the user activity classification circuitry 406 identifies the action as unintentional (block 810). If and/or when the user activity classification circuitry 406 determines that the action is a not logged unintentional action (block 808: NO), the user activity classification circuitry 406 sources contextual data (block 812). In some examples, the contextual data includes, for example, audio data, visual data, movement data, data related to what device a user focuses on, data related to the virtual environment, emotion data, and other types of data to establish a context of the virtual environment.

The user activity classification circuitry 406 determines if the audio data in the action (i.e., the action identified in block 708 of FIG. 7) is consistent with the context (block 814). If and/or when the user activity classification circuitry 406 determines that the audio data is not consistent with the context (block 814: NO), the user activity classification circuitry 406 identifies the action as unintentional (block 810). If and/or when the user activity classification circuitry 406 determines that the audio data is consistent with the context (block 814: YES), the user activity classification circuitry 406 determines if the action (i.e., the action identified in block 708 of FIG. 7) is of the user's attention turning to a device not connected to the virtual environment (block 816).

If and/or when the user activity classification circuitry 406 determines that the user's attention has turned to a device not connected to the virtual environment (block 816: YES), the user activity classification circuitry 406 identifies the action as unintentional (block 810). If and/or when the user activity classification circuitry 406 determines that the user's attention has not turned to a device not connected to the virtual environment (block 816: NO), the user activity classification circuitry 406 determines if the action (i.e., the action identified in block 708 of FIG. 7) is a movement consistent with the context of the virtual environment (block 818).

If and/or when the user activity classification circuitry 406 determines that the movement is not consistent with the context (block 818: NO), the user activity classification circuitry 406 identifies the action as unintentional (block 810). If and/or when the user activity classification circuitry 406 determines the movement is consistent with the context (block 818: YES), the user activity classification circuitry 406 determines if the action (i.e., the action identified in block 708 of FIG. 7) is of an emotion consistent with the context of the virtual environment (block 820).

If and/or when the user activity classification circuitry 406 determines that the emotion is not consistent with the context (block 820: NO), the user activity classification circuitry 406 identifies the action as unintentional (block 810). If and/or when the user activity classification circuitry 406 determines that the emotion is consistent with the context (block 820: YES), the user activity classification circuitry 406 identifies the action as intentional (block 806).

Once the user activity classification circuitry 406 identifies the action as intentional (block 806) or identifies the action as unintentional (block 810), the user activity classification circuitry 406 determines the action and its corresponding classification should be logged (block 822). For example, the action and its corresponding classification can be logged for use in future analysis to save processing resources by allowing the user activity classification circuitry 406 to identify the type of action (intentional or unintentional) and skip blocks 812-820 in this example process 710.

If and/or when the user activity classification circuitry 406 determines that the action and its corresponding classification should be logged (block 822: YES), the user activity classification circuitry 406 logs the action (block 824). After logging the action (block 824) or if and/or when the user activity classification circuitry 406 determines that the action and its corresponding classification should be not logged (block 822: NO), the example process advances from block 710 in FIG. 7 to block 712 if the action is intentional or to block 722 if the action is unintentional.

FIG. 9 is a flowchart representative of example machine readable instructions and/or example operations 716 (of FIG. 7) that may be executed and/or instantiated by processor circuitry to determine if an avatar adjustment for altering a position or orientation of an avatar. The example operations 716 include the offset orientation circuitry 408 accessing world coordinates (block 902). The world coordinates correspond the user's position or orientation with respect to the content of interest (e.g., the display of the virtual environment). The offset orientation circuitry 408 also accessed the camera image coordinates (block 904). The camera image coordinates correspond the user's position or orientation with respect to the camera used to map the user's actions to the avatar.

The offset orientation circuitry 408 determines the difference between the world coordinates and the camera image coordinates (block 906). The avatar model circuitry 412 sets the difference as the adjustment for the avatar model (block 908). The example process 716 then proceeds to block 718 of FIG. 7.

Figure 10:
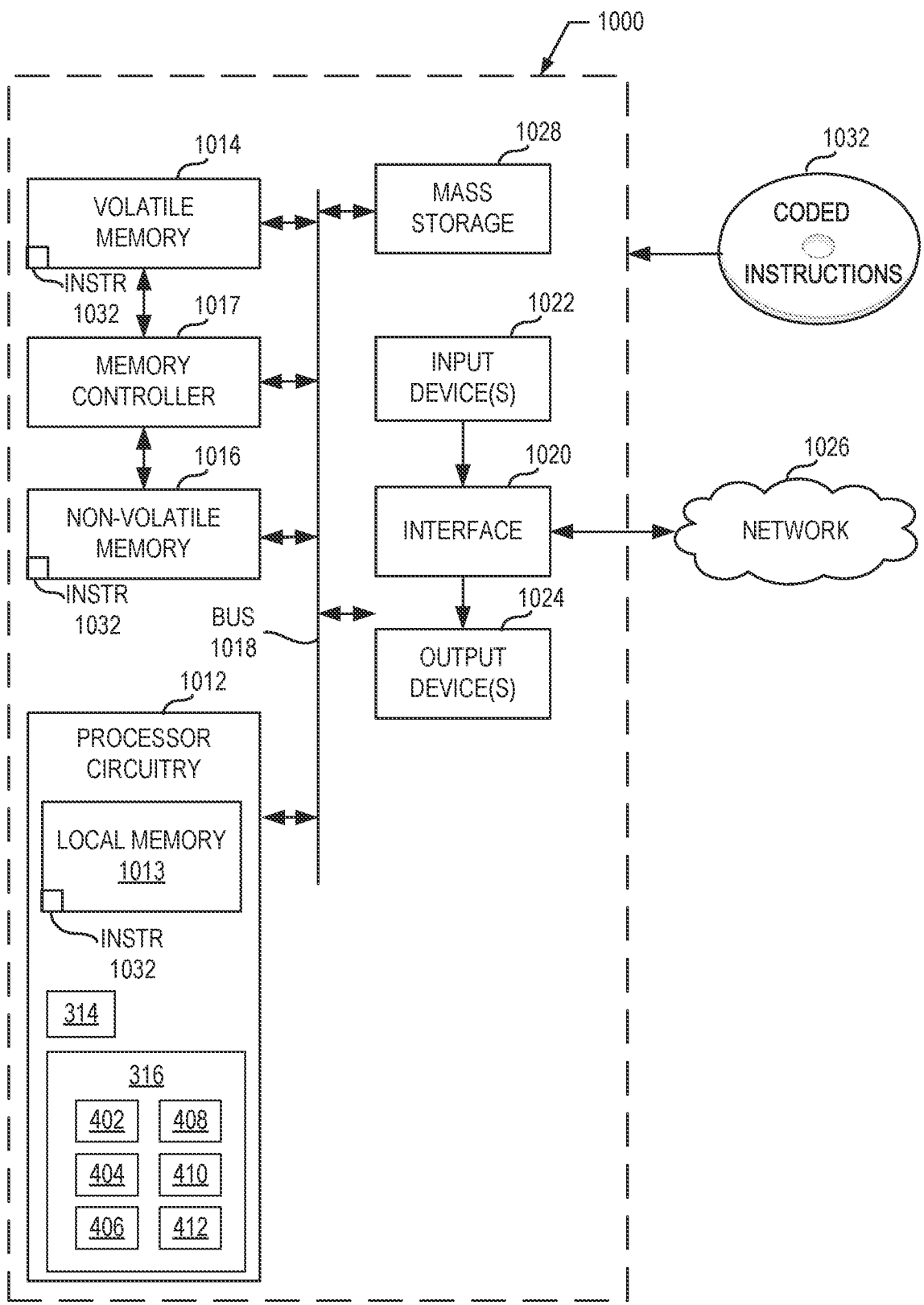
FIG. 10 is a block diagram of an example processing platform including processor circuitry structured to execute the example machine readable instructions and/or the example operations of FIGS. 7-9 to implement the avatar adjustment application of FIG. 3.

FIG. 10 is a block diagram of an example processor platform 1000 structured to execute and/or instantiate the machine readable instructions and/or the operations of FIGS. 7-9 to implement the avatar adjustment application 316 of FIGS. 3 and 4. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs, microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements the program identification circuitry 314, the avatar adjustment application 316, the user orientation circuitry 402, the object recognition circuitry 404, the activity classification circuitry 406, the orientation offset circuitry 408, the avatar mapping circuitry 410, and the avatar model circuitry 412.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuitry 1020 of the illustrated example. The output device(s) 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1032, which may be implemented by the machine readable instructions of FIGS. 7-9, may be stored in the mass storage device 1028, in the volatile memory 1014, in the non-volatile memory 1016, and/or on a removable non-transitory computer readable storage medium such as a CD or DVD.

Figure 11:
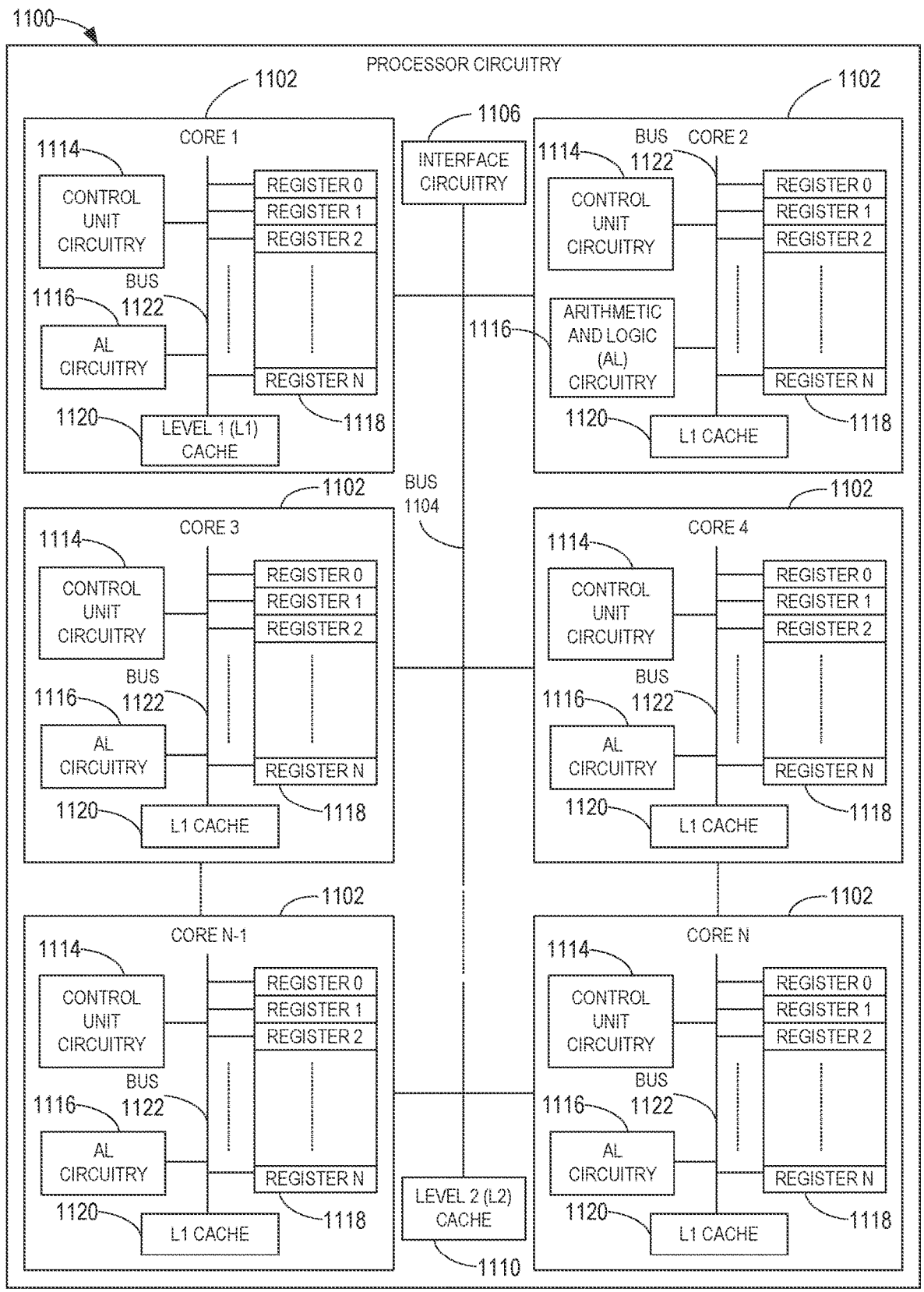
FIG. 11 is a block diagram of an example implementation of the processor circuitry of FIG. 10.

FIG. 11 is a block diagram of an example implementation of the processor circuitry 1012 of FIG. 10. In this example, the processor circuitry 1012 of FIG. 10 is implemented by a microprocessor 1100. For example, the microprocessor 1100 may be a general purpose microprocessor (e.g., general purpose microprocessor circuitry). The microprocessor 1100 executes some or all of the machine readable instructions of the flowcharts of FIGS. 7-9 to effectively instantiate the circuitry of FIGS. 3 and 4 as logic circuits to perform the operations corresponding to those machine readable instructions. In some such examples, the circuitry of FIGS. 3 and 4 is instantiated by the hardware circuits of the microprocessor 1100 in combination with the instructions. For example, the microprocessor 1100 may be implemented by multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine readable instructions and/or operations represented by the flowcharts of FIGS. 7-9.

The cores 1102 may communicate by a first example bus 1104. In some examples, the first bus 1104 may be implemented by a communication bus to effectuate communication associated with one(s) of the cores 1102. For example, the first bus 1104 may be implemented by at least one of an Inter-Integrated Circuit (I2C) bus, a Serial Peripheral Interface (SPI) bus, a PCI bus, or a PCIe bus. Additionally or alternatively, the first bus 1104 may be implemented by any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2 cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry 1116 (sometimes referred to as an ALU), a plurality of registers 1118, the local memory 1120, and a second example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating point operations. In yet other examples, the AL circuitry 1116 may include first AL circuitry that performs integer based operations and second AL circuitry that performs floating point operations. In some examples, the AL circuitry 1116 may be referred to as an Arithmetic Logic Unit (ALU). The registers 1118 are semiconductor-based structures to store data and/or instructions such as results of one or more of the operations performed by the AL circuitry 1116 of the corresponding core 1102. For example, the registers 1118 may include vector register(s), SIMD register(s), general purpose register(s), flag register(s), segment register(s), machine specific register(s), instruction pointer register(s), control register(s), debug register(s), memory management register(s), machine check register(s), etc. The registers 1118 may be arranged in a bank as shown in FIG. 11. Alternatively, the registers 1118 may be organized in any other arrangement, format, or structure including distributed throughout the core 1102 to shorten access time. The second bus 1122 may be implemented by at least one of an I2C bus, a SPI bus, a PCI bus, or a PCIe bus Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 12:
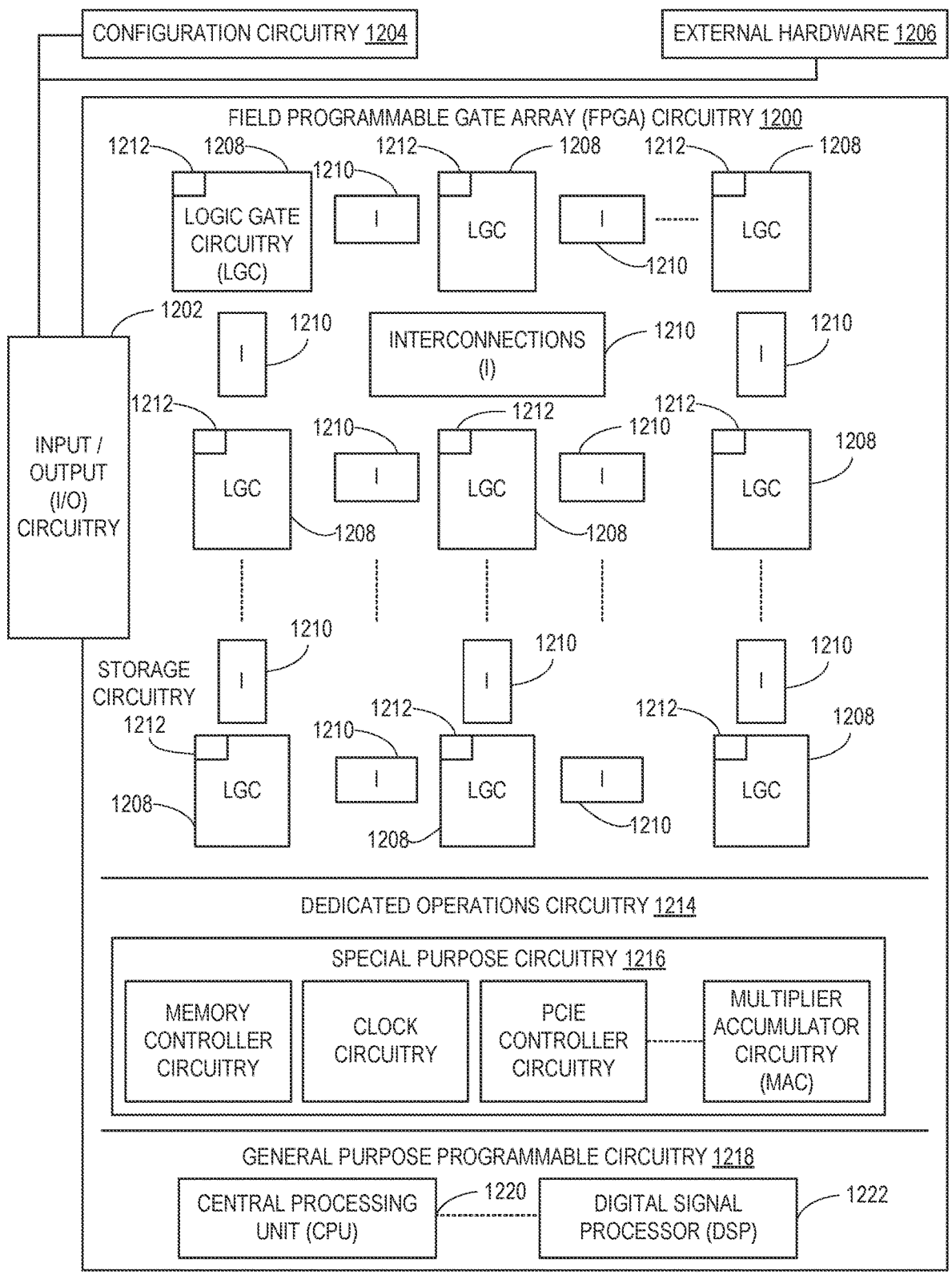
FIG. 12 is a block diagram of another example implementation of the processor circuitry of FIG. 10.

FIG. 12 is a block diagram of another example implementation of the processor circuitry 1012 of FIG. 10. In this example, the processor circuitry 1012 is implemented by FPGA circuitry 1200. For example, the FPGA circuitry 1200 may be implemented by an FPGA. The FPGA circuitry 1200 can be used, for example, to perform operations that could otherwise be performed by the example microprocessor 1100 of FIG. 11 executing corresponding machine readable instructions. However, once configured, the FPGA circuitry 1200 instantiates the machine readable instructions in hardware and, thus, can often execute the operations faster than they could be performed by a general purpose microprocessor executing the corresponding software.

More specifically, in contrast to the microprocessor 1100 of FIG. 11 described above (which is a general purpose device that may be programmed to execute some or all of the machine readable instructions represented by the flowcharts of FIGS. 7-9 but whose interconnections and logic circuitry are fixed once fabricated), the FPGA circuitry 1200 of the example of FIG. 12 includes interconnections and logic circuitry that may be configured and/or interconnected in different ways after fabrication to instantiate, for example, some or all of the machine readable instructions represented by the flowcharts of FIG. 7-9. In particular, the FPGA circuitry 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the software represented by the flowcharts of FIGS. 7-9. As such, the FPGA circuitry 1200 may be structured to effectively instantiate some or all of the machine readable instructions of the flowcharts of FIGS. 7-9 as dedicated logic circuits to perform the operations corresponding to those software instructions in a dedicated manner analogous to an ASIC. Therefore, the FPGA circuitry 1200 may perform the operations corresponding to the some or all of the machine readable instructions of FIGS. 7-9 faster than the general purpose microprocessor can execute the same.

In the example of FIG. 6, the FPGA circuitry 1200 is structured to be programmed (and/or reprogrammed one or more times) by an end user by a hardware description language (HDL) such as Verilog. The FPGA circuitry 1200 of FIG. 12, includes example input/output (I/O) circuitry 1202 to obtain and/or output data to/from example configuration circuitry 1204 and/or external hardware 1206. For example, the configuration circuitry 1204 may be implemented by interface circuitry that may obtain machine readable instructions to configure the FPGA circuitry 1200, or portion(s) thereof. In some such examples, the configuration circuitry 1204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1206 may be implemented by external hardware circuitry. For example, the external hardware 1206 may be implemented by the microprocessor 1100 of FIG. 11. The FPGA circuitry 1200 also includes an array of example logic gate circuitry 1208, a plurality of example configurable interconnections 1210, and example storage circuitry 1212. The logic gate circuitry 1208 and the configurable interconnections 1210 are configurable to instantiate one or more operations that may correspond to at least some of the machine readable instructions of FIGS. 7-9 and/or other desired operations. The logic gate circuitry 1208 shown in FIG. 12 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations. The logic gate circuitry 1208 may include other electrical structures such as look-up tables (LUTs), registers (e.g., flip-flops or latches), multiplexers, etc.

The configurable interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example Dedicated Operations Circuitry 1214. In this example, the Dedicated Operations Circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 12 illustrate two example implementations of the processor circuitry 1012 of FIG. 10, many other approaches are contemplated. For example, as mentioned above, modern FPGA circuitry may include an on-board CPU, such as one or more of the example CPU 1220 of FIG. 12. Therefore, the processor circuitry 1012 of FIG. 10 may additionally be implemented by combining the example microprocessor 1100 of FIG. 11 and the example FPGA circuitry 1200 of FIG. 6. In some such hybrid examples, a first portion of the machine readable instructions represented by the flowcharts of FIGS. 7-9 may be executed by one or more of the cores 1102 of FIG. 11, a second portion of the machine readable instructions represented by the flowcharts of FIGS. 7-9 may be executed by the FPGA circuitry 1200 of FIG. 12, and/or a third portion of the machine readable instructions represented by the flowcharts of FIGS. 7-9 may be executed by an ASIC. It should be understood that some or all of the circuitry of FIGS. 3 and 4 may, thus, be instantiated at the same or different times. Some or all of the circuitry may be instantiated, for example, in one or more threads executing concurrently and/or in series. Moreover, in some examples, some or all of the circuitry of FIGS. 3 and 4 may be implemented within one or more virtual machines and/or containers executing on the microprocessor.

In some examples, the processor circuitry 1012 of FIG. 10 may be in one or more packages. For example, the microprocessor 1100 of FIG. 11 and/or the FPGA circuitry 1200 of FIG. 12 may be in one or more packages. In some examples, an XPU may be implemented by the processor circuitry 1012 of FIG. 10, which may be in one or more packages. For example, the XPU may include a CPU in one package, a DSP in another package, a GPU in yet another package, and an FPGA in still yet another package.

Figure 13:
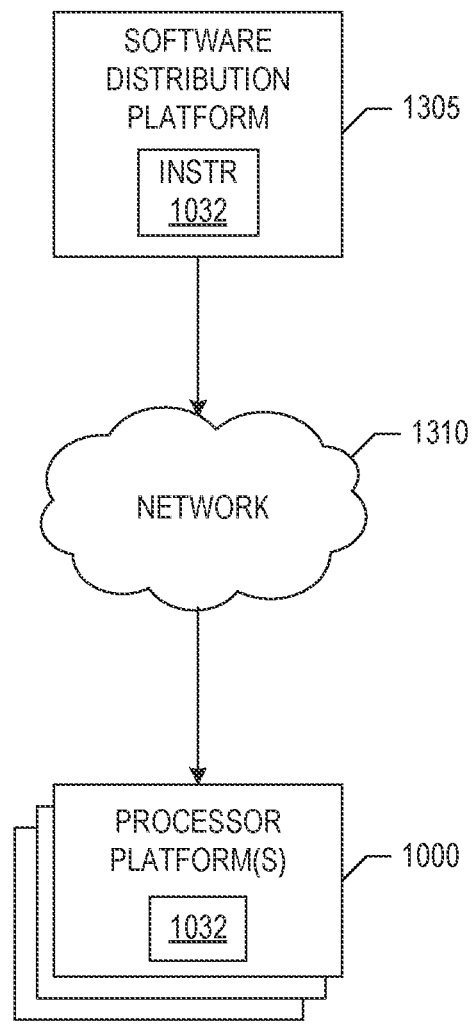
FIG. 13 is a block diagram of an example software distribution platform (e.g., one or more servers) to distribute software (e.g., software corresponding to the example machine readable instructions of FIGS. 7-9) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1305 to distribute software such as the example machine readable instructions 1032 of FIG. 10 to hardware devices owned and/or operated by third parties is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine readable instructions 1032 of FIG. 10. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine readable instructions 1032, which may correspond to the example machine readable instructions 700 of FIGS. 7-9, as described above. The one or more servers of the example software distribution platform 1305 are in communication with an example network 1310, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1032 from the software distribution platform 1305. For example, the software, which may correspond to the example machine readable instructions 700 of FIGS. 7-9, may be downloaded to the example processor platform 1000, which is to execute the machine readable instructions 1032 to implement the avatar adjustment application 316. In some examples, one or more servers of the software distribution platform 1305 periodically offer, transmit, and/or force updates to the software (e.g., the example machine readable instructions 1032 of FIG. 10) to ensure improvements, patches, updates, etc., are distributed and applied to the software at the end user devices.

From the foregoing, it will be appreciated that example systems, methods, apparatus, and articles of manufacture have been disclosed that prevent the translation or reproduction of unintentional actions of a user in a real world environment to an avatar in a virtual environment and also correct a mis-aligned or mis-oriented avatar. Examples disclosed herein enable a clearer and less confusing virtual environment. Thus, disclosed systems, methods, apparatus, and articles of manufacture improve the efficiency of using a computing device by eliminating needless input for avatar reproduction, which saves processing resources. Disclosed systems, methods, apparatus, and articles of manufacture are accordingly directed to one or more improvement(s) in the operation of a machine such as a computer or other electronic and/or mechanical device.

Examples disclosed herein also enable better avatar representation for users accessing a virtual environment (e.g., metaverse applications) from a PC, phone, and/or other non-HMD device. Examples disclosed herein also correct avatar orientation and enable user-to-user (avatar-to-avatar) eye contact.

Example methods, apparatus, systems, and articles of manufacture for user-to-avatar mapping and adjustment are disclosed herein. Example 1 includes an apparatus to map user-to-avatar action. The apparatus includes at least one memory; machine readable instructions; and processor circuitry to at least one of instantiate or execute the machine readable instructions to: determine if a user action is intentional or unintentional; prevent mapping of the user action to an avatar model based on a determination that the user action is unintentional; determine if there is dissonance between a first orientation of the user and a second orientation of the avatar based on a determination that the user action is intentional; determine an avatar adjustment value based on (1) the dissonance or (2) based on a determination that the user action is an unintentional position of the user; and apply the avatar adjustment value to the avatar model.

Example 2 includes the apparatus of Example 1, wherein the processor circuitry is to determine if the user action is intentional or unintentional by: assessing context of audio data; determining if audio input from a user device is consistent with the context; and categorizing the user action as intentional when the audio input is consistent with the context and as unintentional when the audio input is inconsistent with the context.

Example 3 includes the apparatus of Examples 1 and/or 2, wherein the avatar is presented in a virtual environment, and the processor circuitry is to determine if the user action is intentional or unintentional by: assessing a gaze direction of the user; determining if the gaze direction is toward a device coupled to virtual environment; and categorizing the user action as intentional when the gaze is directed to a device coupled to the virtual environment and as unintentional when the gaze is directed to a device not coupled to the virtual environment.

Example 4 includes the apparatus of any of Examples 1-3, wherein the avatar is presented in a virtual environment, and the processor circuitry is to determine if the user action is intentional or unintentional by: assessing context of the virtual environment; determining if the user action is consistent with the context; and categorizing the user action as intentional when the action is consistent with the context and as unintentional when the action is inconsistent with the context.

Example 5 includes the apparatus of any of Examples 1-4, wherein the avatar is presented in a virtual environment, and the processor circuitry is to determine if the user action is intentional or unintentional by: assessing context of the virtual environment; assessing audio data; determining a mood of the virtual environment based on the context and the audio data; assessing an emotion of the user; determining if the emotion is consistent with the mood; and categorizing the user action as intentional when the emotion is consistent with the mood and as unintentional when the emotion is inconsistent with the mood.

Example 6 includes the apparatus of any of Examples 1-5, wherein processor circuitry is to determine the dissonance by: identifying a first set of coordinates based on the first orientation; identifying a second set of coordinates based on the first orientation; and determining a difference between the first set of coordinate and the second set of coordinates.

Example 7 includes the apparatus of Example 6, wherein processor circuitry is to determine the avatar adjustment value based on the difference.

Example 8 includes the apparatus of Example 7, wherein the processor circuitry is to set the second orientation to a third set of coordinates based on the avatar adjustment value.

Example 9 includes the apparatus of any of Examples 1-8, wherein the processor circuitry is to map the avatar model with the avatar adjustment value to a human interface device stream.

Example 10 includes the apparatus of any of Examples 1-9, wherein the processor circuitry is to adjust audio data based on the avatar model with the avatar adjustment value.

Example 11 includes a non-transitory machine readable storage medium comprising instructions to cause one or more processors to at least: categorize a user action as unintentional; prevent mapping of the user action to an avatar model; identify a dissonance between a first orientation of a head of the user and a second orientation of a head of the avatar; determine an avatar adjustment value based on the dissonance; and apply the avatar adjustment value to the avatar model.

Example 12 includes the storage medium of Example 11, wherein the avatar is presented in a virtual environment, and the instructions cause the one or more processors to categorize the user action as unintentional by: assessing one or more of context of audio data, a gaze direction of the user, or context of the virtual environment; determining one or more of (1) if audio input from a user device is consistent with the context of the audio data, (2) determining if the gaze direction is toward a device coupled to virtual environment, (3) determining if the user action is consistent with the context of the virtual environment, or (4) determining a mood of the virtual environment based on the context of the virtual environment and the audio data, assessing an emotion of the user, and determining if the emotion is consistent with the mood; and categorizing the user action as unintentional when one or more of (1) the audio input is inconsistent with the context of the audio data, (2) the gaze is directed to a device not coupled to the virtual environment, (3) when the action is inconsistent with the context of the virtual environment, or (4) the emotion is inconsistent with the mood.

Example 13 includes the storage medium of Examples 11 and/or 12, wherein the avatar is presented in a virtual environment, and the instructions cause the one or more processors to categorize the user action as unintentional by: assessing context of audio data, a gaze direction of the user, and context of the virtual environment; determining (1) if audio input from a user device is consistent with the context of the audio data, (2) if the gaze direction is toward a device coupled to virtual environment, and (3) if the user action is consistent with the context of the virtual environment; and categorizing the user action as unintentional when one or more of (1) the audio input is inconsistent with the context of the audio data, (2) the gaze is directed to a device not coupled to the virtual environment, or (3) when the action is inconsistent with the context of the virtual environment.

Example 14 includes the storage medium of any of Examples 11-13, wherein the instructions cause the one or more processors to identify the dissonance by: identifying a first set of coordinates based on the first orientation; identifying a second set of coordinates based on the first orientation; and determining a difference between the first set of coordinate and the second set of coordinates.

Example 15 includes the storage medium of any of Examples 11-14, wherein the instructions cause the one or more processors to determine the avatar adjustment value based on the difference.

Example 16 includes the storage medium of any of Examples 11-15, wherein the instructions cause the one or more processors to set the second orientation to a third set of coordinates based on the avatar adjustment value.

Example 17 includes an apparatus to map user-to-avatar action, the apparatus comprising: at least one memory; machine readable instructions; and processor circuitry to at least one of instantiate or execute the machine readable instructions to: determine a dissonance between a first orientation of a body of a user in a real-world environment and a second orientation of a body of an avatar in a virtual environment, the avatar corresponding to the user; determine an avatar adjustment value based on the dissonance; and apply the avatar adjustment value to an avatar model to change the second orientation.

Example 18 includes the apparatus of Example 17, wherein processor circuitry is to determine the dissonance by: identifying a first set of coordinates based on the first orientation; identifying a second set of coordinates based on the first orientation; and determining a difference between the first set of coordinate and the second set of coordinates.

Example 19 includes the apparatus of Example 18, wherein processor circuitry is to: determine the avatar adjustment value based on the difference; and set the second orientation to a third set of coordinates based on the avatar adjustment value.

Example 20 includes the apparatus of any of Examples 17-19, wherein the processor circuitry is to adjust audio data in the virtual environment based on the avatar model with the avatar adjustment value.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to map user-to-avatar action, the apparatus comprising:
   machine readable instructions; and
   at least one processor circuit to be programmed by the machine readable instructions to:
   determine if a user action is intentional or unintentional;
   prevent mapping of the user action to an avatar model based on a determination that the user action is unintentional;
   identify a dissonance between a first orientation of a user and a second orientation of an avatar by:
   comparing a first set of coordinates to a second set of coordinates, the first set of coordinates based on the first orientation of the user relative to content of interest and the second set of coordinates based on the second orientation of the avatar; and
   identifying an inconsistency between the first set of coordinates and the second set of coordinates;
   identify, based on the dissonance, a difference between the first set of coordinates and a third set of coordinates, the third set of coordinates based on the first orientation of the user relative to a camera;
   determine an avatar adjustment value based on the difference; and
   apply the avatar adjustment value to the avatar model.

2. The apparatus of claim 1, wherein one or more of the at least one processor circuit is to determine if the user action is intentional or unintentional by:
   assessing context of audio data;
   determining if audio input from a user device is consistent with the context; and
   categorizing the user action as intentional when the audio input is consistent with the context and as unintentional when the audio input is inconsistent with the context.

3. The apparatus of claim 1, wherein the avatar is presented in a virtual environment, and one or more of the at least one processor circuit is to determine if the user action is intentional or unintentional by:
   assessing a gaze direction of the user;

determining if the gaze direction is toward a device coupled to the virtual environment; and categorizing the user action as intentional when the gaze is directed to a device coupled to the virtual environment and as unintentional when the gaze is directed to a device not coupled to the virtual environment.

4. The apparatus of claim 1, wherein the avatar is presented in a virtual environment, and one or more of the at least one processor circuit is to determine if the user action is intentional or unintentional by:

assessing context of the virtual environment;

determining if the user action is consistent with the context; and categorizing the user action as intentional when the user action is consistent with the context and as unintentional when the action is inconsistent with the context.

5. The apparatus of claim 1, wherein the avatar is presented in a virtual environment, and one or more of the at least one processor circuit is to determine if the user action is intentional or unintentional by:

assessing context of the virtual environment;

assessing audio data;

determining a mood of the virtual environment based on the context and the audio data;

assessing an emotion of the user;

determining if the emotion is consistent with the mood; and categorizing the user action as intentional when the emotion is consistent with the mood and as unintentional when the emotion is inconsistent with the mood.

6. The apparatus of claim 1, wherein one or more of the at least one processor circuit is to set the second orientation to a fourth set of coordinates based on the avatar adjustment value.

7. The apparatus of claim 1, wherein one or more of the at least one processor circuit is to map the avatar model with the avatar adjustment value to a human interface device stream.

8. The apparatus of claim 1, wherein one or more of the at least one processor circuit is to adjust audio data based on the avatar model with the avatar adjustment value.

9. A non-transitory machine readable storage medium comprising instructions to cause one or more processors to at least:

perform a first comparison of a first set of coordinates to a second set of coordinates, the first set of coordinates based on a first orientation of a head of a user relative to a first reference point, the second set of the coordinates based on a second orientation of a head of an avatar;

identify, based on the first comparison, a dissonance between the first orientation of the head of the user and the second orientation of the head of the avatar;

perform a second comparison of the first set of coordinates to a third set of coordinates, the third set of coordinates based on the first orientation of the head of the user relative to a second reference point;

identify a difference between the first set of coordinates and the third set of coordinates based on the second comparison;

determine an avatar adjustment value based on the difference; and apply the avatar adjustment value to the avatar.

10. The storage medium of claim 9, wherein the avatar is presented in a virtual environment, and the instructions cause at least one of the one or more processors to:

assess one or more of context of audio data, a gaze direction of the user, or context of the virtual environment;

determine one or more of (1) if audio input from a user device is consistent with the context of the audio data, (2) if the gaze direction is toward a device coupled to virtual environment, (3) if a user action is consistent with the context of the virtual environment, (4) a mood of the virtual environment based on the context of the virtual environment and the audio data, (5) an emotion of the user, or (6) if the emotion is consistent with the mood;

categorize the user action as unintentional when one or more of (1) the audio input is inconsistent with the context of the audio data, (2) the gaze is directed to a device not associated with the virtual environment, (3) the action is inconsistent with the context of the virtual environment, or (4) the emotion is inconsistent with the mood; and prevent mapping of the user action to the avatar.

11. The storage medium of claim 9, wherein the avatar is presented in a virtual environment, and the instructions cause at least one of the one or more processors to:

assess context of audio data, a gaze direction of the user, and context of the virtual environment;

determine (1) if audio input from a user device is consistent with the context of the audio data, (2) if the gaze direction is toward a device associated with virtual environment, and (3) if a user action is consistent with the context of the virtual environment;

categorize the user action as unintentional when one or more of (1) the audio input is inconsistent with the context of the audio data, (2) the gaze is directed to a device not associated with the virtual environment, or (3) when the user action is inconsistent with the context of the virtual environment; and prevent mapping of the user action to the avatar.

12. The storage medium of claim 9, wherein the instructions cause at least one of the one or more processors to set the second orientation to a fourth set of coordinates based on the avatar adjustment value.

13. The storage medium of claim 9, wherein the first reference point is a display screen and the second reference point is a camera.

14. An apparatus to map user-to-avatar action, the apparatus comprising:

machine readable instructions; and at least one processor circuitry to at least one of instantiate or execute the machine readable instructions to:

determine a dissonance between a first orientation of a body of a user in a real-world environment and a second orientation of a body of an avatar corresponding to the user in a virtual environment by:

identifying a first set of coordinates based on the first orientation;

identifying a second set of coordinates based on the second orientation; and determining an inconsistency between the first set of coordinates and the second set of coordinates;

determine, based on the dissonance, a difference between the first set of coordinates and a third set of coordinates, the first set of coordinates and the third set of coordinates based on the same first orientation of the body of the user relative to two different points of reference;

determine an avatar adjustment value based on the difference; and apply the avatar adjustment value to an avatar model to change the second orientation.

15. The apparatus of claim 14, wherein processor circuitry is to determine the avatar adjustment value based on the difference; and set the second orientation to a fourth third set of coordinates based on the avatar adjustment value.

16. The apparatus of claim 14, wherein the processor circuitry is to adjust audio data in the virtual environment based on the avatar model with the avatar adjustment value.

17. The apparatus of claim 14, wherein a first of the two different points of reference is a first position of content of interest and a second of the two different points of reference is a second position of an image capture sensor.

18. The apparatus of claim 17, wherein the content of interest is a display screen.

* * * * *